US012052699B2

(12) United States Patent
Kim et al.

(10) Patent No.: US 12,052,699 B2
(45) Date of Patent: Jul. 30, 2024

(54) METHOD FOR TRANSMITTING OR RECEIVING SIGNAL IN WIRELESS COMMUNICATION SYSTEM AND APPARATUS FOR SUPPORTING SAME

(71) Applicant: LG ELECTRONICS INC., Seoul (KR)

(72) Inventors: Seonwook Kim, Seoul (KR); Sukhyon Yoon, Seoul (KR); Suckchel Yang, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 453 days.

(21) Appl. No.: 17/606,138

(22) PCT Filed: May 4, 2020

(86) PCT No.: PCT/KR2020/005859

§ 371 (c)(1),
(2) Date: Oct. 25, 2021

(87) PCT Pub. No.: WO2020/222599

PCT Pub. Date: Nov. 5, 2020

(65) Prior Publication Data

US 2022/0322349 A1 Oct. 6, 2022

(30) Foreign Application Priority Data

May 2, 2019 (KR) ........................ 10-2019-0051769
Nov. 6, 2019 (KR) ........................ 10-2019-0141106

(51) Int. Cl.
*H04W 72/0453* (2023.01)
*H04L 5/00* (2006.01)
*H04W 72/23* (2023.01)

(52) U.S. Cl.
CPC ....... *H04W 72/0453* (2013.01); *H04L 5/0048* (2013.01); *H04W 72/23* (2023.01)

(58) Field of Classification Search
CPC ............. H04W 72/0453; H04W 72/23; H04W 74/0808; H04L 5/0048; H04L 5/0007; H04L 5/0053; H04L 5/0094
(Continued)

(56) References Cited

U.S. PATENT DOCUMENTS

2018/0183551 A1 6/2018 Chou et al.
2019/0268883 A1* 8/2019 Zhang .................. H04L 5/0094
(Continued)

OTHER PUBLICATIONS

Nokia, Nokia Shanghai Bell, "On wideband operation in NR-U", 3GPP TSG RAN WG1 Meeting #96bis, Apr. 8-12, 2019, R1-1904194.
(Continued)

*Primary Examiner* — Obaidul Huq
(74) *Attorney, Agent, or Firm* — BRYAN CAVE LEIGHTON PAISNER LLP

(57) ABSTRACT

The present disclosure relates to a wireless communication system and, specifically, to a method and an apparatus therefor, the method comprising the steps of: receiving information relating to a BWP for reception of a downlink signal; receiving type information of a base station; receiving frequency resource allocation information for configuring a control resource set (CORESET) in the BWP; and receiving a physical downlink control channel (PDCCH) in the BWP on the basis of the type information and the frequency resource allocation information, wherein the BWP includes N number of frequency units in which a CAP for an unlicensed band is performed, N is an integer of two or larger, particular frequency resource sections are configured between the frequency units, the number of the particular frequency resource sections is N-1, and whether the
(Continued)

S1702 Allocating BWP
S1704 Receiving frequency resource allocation information for reception of DL signal
S1706 Receiving type information of base station
S1708 Receiving DL signal PDCCH is received in the particular frequency resource sections is determined on the basis of the type information.

12 Claims, 22 Drawing Sheets

(58) Field of Classification Search
USPC ......................................... 370/310, 328, 329
See application file for complete search history.

(56) References Cited

U.S. PATENT DOCUMENTS

2020/0288447 A1* 9/2020 Shen ..................... H04W 72/23
2022/0078834 A1* 3/2022 Wu ..................... H04L 27/0006

OTHER PUBLICATIONS

NTT DoCoMo, Inc., "Wide-band operation for NR-U", 3GPP TSG RAN WG1 #96bis, Apr. 8-12, 2019, R1-1904952.
Vivo, "Discussion on wideband operation in NR-U", 3GPP TSG RAN WG1 #96bis, Apr. 8-12, 2019, R1-1904069.
ETRI, "Wideband operation for NR-U", 3GPP TSG RAN WG1 Meeting #96bis, Apr. 8-12, 2019, R1-1904604.

* cited by examiner (a) Carrier aggregation between L-band and U-band (b) Standalone U-band(s)

(a)

(b)

METHOD FOR TRANSMITTING OR RECEIVING SIGNAL IN WIRELESS COMMUNICATION SYSTEM AND APPARATUS FOR SUPPORTING SAME

This application is the National Stage filing under 35 U.S.C. 371 of International Application No. PCT/KR2020/005859 filed on May 4, 2020, which claims priority to Korean Patent Application Nos. 10-2019-0051769 filed on May 2, 2019 and 10-2019-0141106 filed on Nov. 6, 2019, the contents of which are all hereby incorporated by reference herein in their entirety.

TECHNICAL FIELD

The present disclosure relates to a wireless communication system, and more particularly to a method for transmitting and receiving signals in a wireless communication system supporting an unlicensed band, and a device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method for efficiently transmitting and receiving radio frequency (RF) signals, and a device for the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with a first aspect of the present disclosure, a method by a user equipment (UE) in a wireless communication system is disclosed.

The method by a user equipment (UE) in a wireless communication system includes receiving information related to a bandwidth part (BWP) for reception of a downlink signal, receiving type information of a base station (BS), receiving frequency resource allocation information constructing a control resource set (CORESET) in the BWP, and receiving a physical downlink control channel (PDCCH) in the BWP based on the type information and the frequency resource allocation information. The BWP includes N number of frequency units in which a channel access procedure (CAP) for an unlicensed band is performed, where N is an integer of 2 or greater. Specific frequency resource sections are configured between the frequency units, wherein the number of the specific frequency resource sections is N−1. Whether the PDCCH is received in the specific frequency resource sections is determined based on the type information.

In accordance with a second aspect of the present disclosure, a user equipment (UE) used in a wireless communication system includes at least one processor, at least one transceiver, and at least one computer memory operatively connected to the at least one processor and the at least one transceiver, and configured to store instructions such that the at least one processor and the at least one transceiver perform specific operations by executing the instructions. The specific operations include receiving information related to a bandwidth part (BWP) for reception of a downlink signal; receiving type information of a base station (BS), receiving frequency resource allocation information constructing a control resource set (CORESET) in the BWP, and receiving a physical downlink control channel (PDCCH) in the BWP based on the type information and the frequency resource allocation information. The BWP includes N number of frequency units in which a channel access procedure (CAP) for an unlicensed band is performed, where N is an integer of 2 or greater. Specific frequency resource sections are configured between the frequency units, wherein the number of the specific frequency resource sections is N−1. Whether the PDCCH is received in the specific frequency resource sections is determined based on the type information.

In accordance with a third aspect of the present disclosure, a device used in a wireless communication system includes at least one processor, and at least one memory operatively connected to the at least one processor, and configured to store instructions such that the at least one processor performs specific operations by executing the instructions. The specific operations include receiving information related to a bandwidth part (BWP) for reception of a downlink signal, receiving type information of a base station (BS), receiving frequency resource allocation information constructing a control resource set (CORESET) in the BWP, and receiving a physical downlink control channel (PDCCH) in the BWP based on the type information and the frequency resource allocation information. The BWP includes N number of frequency units in which a channel access procedure (CAP) for an unlicensed band is performed, where N is an integer of 2 or greater. Specific frequency resource sections are configured between the frequency units, wherein the number of the specific frequency resource sections is N−1. Whether the PDCCH is received in the specific frequency resource sections is determined based on the type information.

In accordance with a fourth aspect of the present disclosure, a processor-readable medium configured to store at least one instruction that allows at least one processor to perform specific operations by executing the instructions includes performing the specific operations. The specific operations include receiving information related to a bandwidth part (BWP) for reception of a downlink signal, receiving type information of a base station (BS), receiving frequency resource allocation information constructing a control resource set (CORESET) in the BWP, and receiving a physical downlink control channel (PDCCH) in the BWP based on the type information and the frequency resource allocation information. The BWP includes N number of frequency units in which a channel access procedure (CAP) for an unlicensed band is performed, where N is an integer of 2 or greater. Specific frequency resource sections are configured between the frequency units, wherein the number of the specific frequency resource sections is N−1. Whether the PDCCH is received in the specific frequency resource sections is determined based on the type information.

Preferably, the information related to the BWP may include a start resource block (RB) index of the BWP and the number of resource blocks (RBs) corresponding to a bandwidth of the BWP.

Preferably, the frequency resource allocation information may include bitmap information of M bits, wherein M is an integer of 2 or greater, and one bit from among the M bits corresponds to one RB set composed of 6 resource blocks (RBs).

Preferably, the bitmap information is configured to determine that, on the basis of a bit value being a first value, the PDCCH is not received in a resource block (RB) set corresponding to the bit, and is configured to determine that, on the basis of a bit value being a second value, the PDCCH is received in a resource block (RB) set corresponding to the bit.

Preferably, a value of a bit corresponding to a resource block (RB) set overlapping the specific frequency resource sections may be determined to be a first value.

Preferably, the type information may be received through higher layer signaling, wherein the type information is any one of: i) a first type in which the PDCCH is received in the specific frequency resource sections; ii) a second type in which the PDCCH is not received in the specific frequency resource sections; and iii) a third type in which the PDCCH is not received in a specific time section from among the specific frequency resource sections, and is received in the remaining time sections other than the specific time section.

Preferably, the method may further include, on the basis of the type information being a first type, receiving the PDCCH based on the M-bit bitmap information; on the basis of the type information being a second type, receiving the PDCCH based on the M-bit bitmap information, wherein the bit corresponding to the RB set that overlaps with the specific frequency resource sections is always determined to be a first value regardless of a predetermined value; and on the basis of the type information being a third type, receiving the PDCCH based on the M-bit bitmap information in the remaining time sections other than the specific time section, wherein the bit corresponding to the RB set that overlaps with the specific frequency resource sections is always determined to be a first value in the specific time section, regardless of a predetermined value.

Preferably, the method may further include: receiving channel state information-reference signal (CSI-RS) resources from the BWP; on the basis of the type information being the first type, determining CSI-RS resources corresponding to the specific frequency resource sections to be valid; on the basis of the type information being the second type, determining CSI-RS resources corresponding to the specific frequency resource sections to be invalid; and on the basis of the type information being the third type, determining CSI-RS resources corresponding to the specific frequency resource sections to be invalid in the specific time period, and determining CSI-RS resources corresponding to the specific frequency resource sections to be valid in the remaining time periods other than the specific time period.

Devises applied to embodiments of the present disclosure may include an autonomous driving device.

The aspects of the present disclosure described above are only some of the preferred embodiments of the present disclosure, and a variety of embodiments reflecting the technical features of the present disclosure can be derived and understood by those skilled in the art, to which the present disclosure pertains, based on the detailed description of the present disclosure described below.

Advantageous Effects

As is apparent from the above description, the embodiments of the present disclosure can efficiently transmit and receive signals in a wireless communication system.

The embodiments of the present disclosure can efficiently use a guard band in an unlicensed band.

The embodiments of the present disclosure can reduce a connection delay caused by channel sensing in an unlicensed band.

The effects that may be achieved with embodiments of the present disclosure are not limited to what has been particularly described hereinabove and other advantages not described herein will be more clearly understood by persons skilled in the art from the following detailed description of the present disclosure. That is, unintended effects in implementing the present disclosure may also be derived by those skilled in the art from the embodiments of the present disclosure.

DESCRIPTION OF DRAWINGS

The accompanying drawings, which are included to provide a further understanding of the disclosure, illustrate embodiments of the present disclosure and together with the description serve to explain the principle of the present disclosure.

BEST MODE

The following technology may be used in various wireless access systems such as code division multiple access (CDMA), frequency division multiple access (OFDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

To clarify the explanation, 3GPP NR is mainly described, by which the technical ideas of the present disclosure are non-limited.

The General of 3GPP System

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
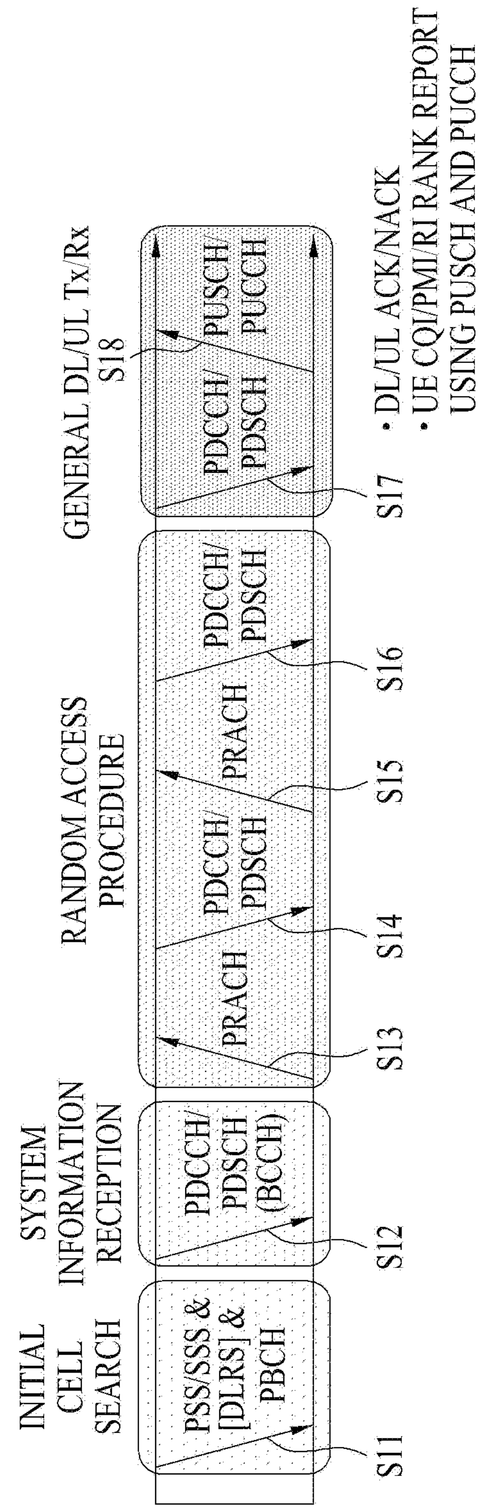
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which Message A is transmitted by the UE), and steps S14 and S16 may be performed as one step (in which Message B is transmitted by the BS).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

A User Equipment (UE) may perform a network access procedure to implement the described/proposed procedures and/or methods of the present disclosure. For example, while performing an access to a network (e.g., a Base Station (BS)), a UE can receive and store system information and configuration information necessary to perform the described/proposed procedures and/or methods described later in memory. Configuration informations necessary for the present disclosure may be received through signaling of higher layers (e.g., RRC layer, Medium Access Control (MAC) layer, etc.).

Figure 2:
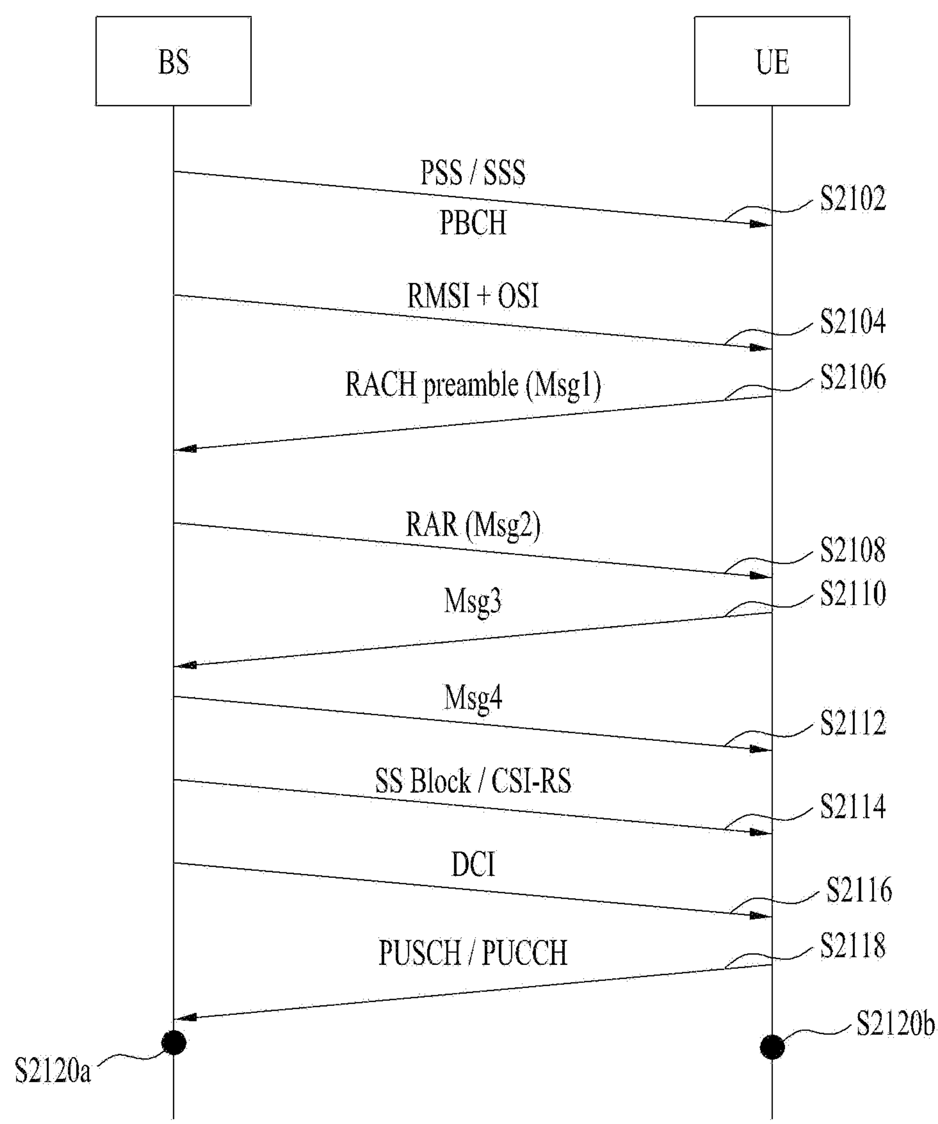
FIG. 2 shows an example of a network initial access and a communication process thereafter.

FIG. 2 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 2, a Base Station (e.g., BS) may periodically transmit an SSB (S2702). The SSB includes a PSS/SSS/PBCH. The SSB may be transmitted by beam sweeping. The BS may then transmit remaining minimum system information (RMSI) and other system information (OSI) (S2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S2708), the UE may transmit Msg3 (e.g., RRC Connection Request) based on a UL grant included in the RAR (S2710), and the BS may transmit a contention resolution message (Msg4) (S2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S2714). The SSB/CSI-RS may be used for the UE to generate a beam/CSI report. The BS may request the UE to transmit a beam/CSI report, by DCI (S2716). In this case, the UE may generate a beam/CSI report based on the SSB/CSI-RS and transmit the generated beam/CSI report to the BS on a PUSCH/PUCCH (S2718). The beam/CSI report may include a beam measurement result, information about a preferred beam, and so on. The BS and the UE may switch beams based on the beam/CSI report (S2720*a* and S2720*b*).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

A UE may perform a Discontinuous Reception (DRX) operation while performing embodiments of the present disclosure described later. A DRC configured UE may reduce power consumption by discontinuously receiving a DL signal. DRX may be performed in Radio Resource Control_IDLE mode (i.e., RRC_IDLE mode), RRC_INACTIVE mode, or RRC_CONNECTED mode. In RRC_IDLE mode and RRC_INACTIVE mode, DRX is used to receive a paging signal discontinuously. Hereinafter, DRX performed in RRC_CONNECTED mode is described (RRC_CONNECTED DRX).

Figure 3:
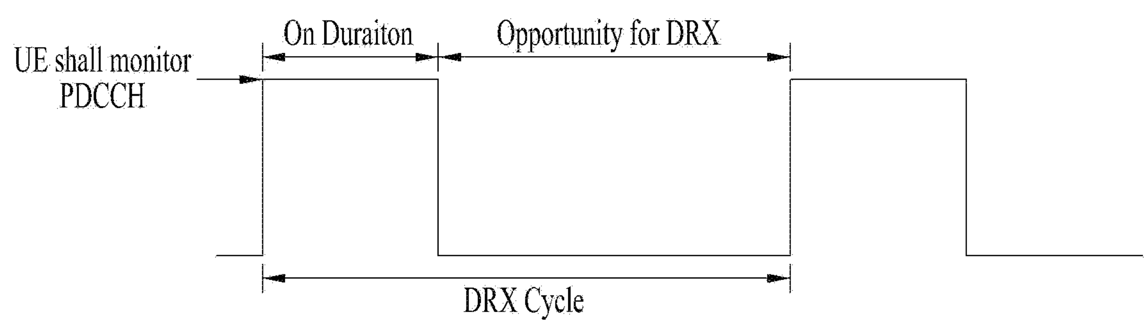
FIG. 3 shows an example of a DRX (Discontinuous Reception) cycle.

FIG. 3 illustrates a DRX cycle (RRC_CONNECTED mode).

Referring to FIG. 3, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 1 describes a DRX operation of a UE (in the RRC_CONNECTED state). Referring to Table 1, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 1

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

For example, according to an embodiment of the present disclosure, if DRX is configured in a UE of the present disclosure, a DL signal may be received in a DRX-on duration.

Figure 4:
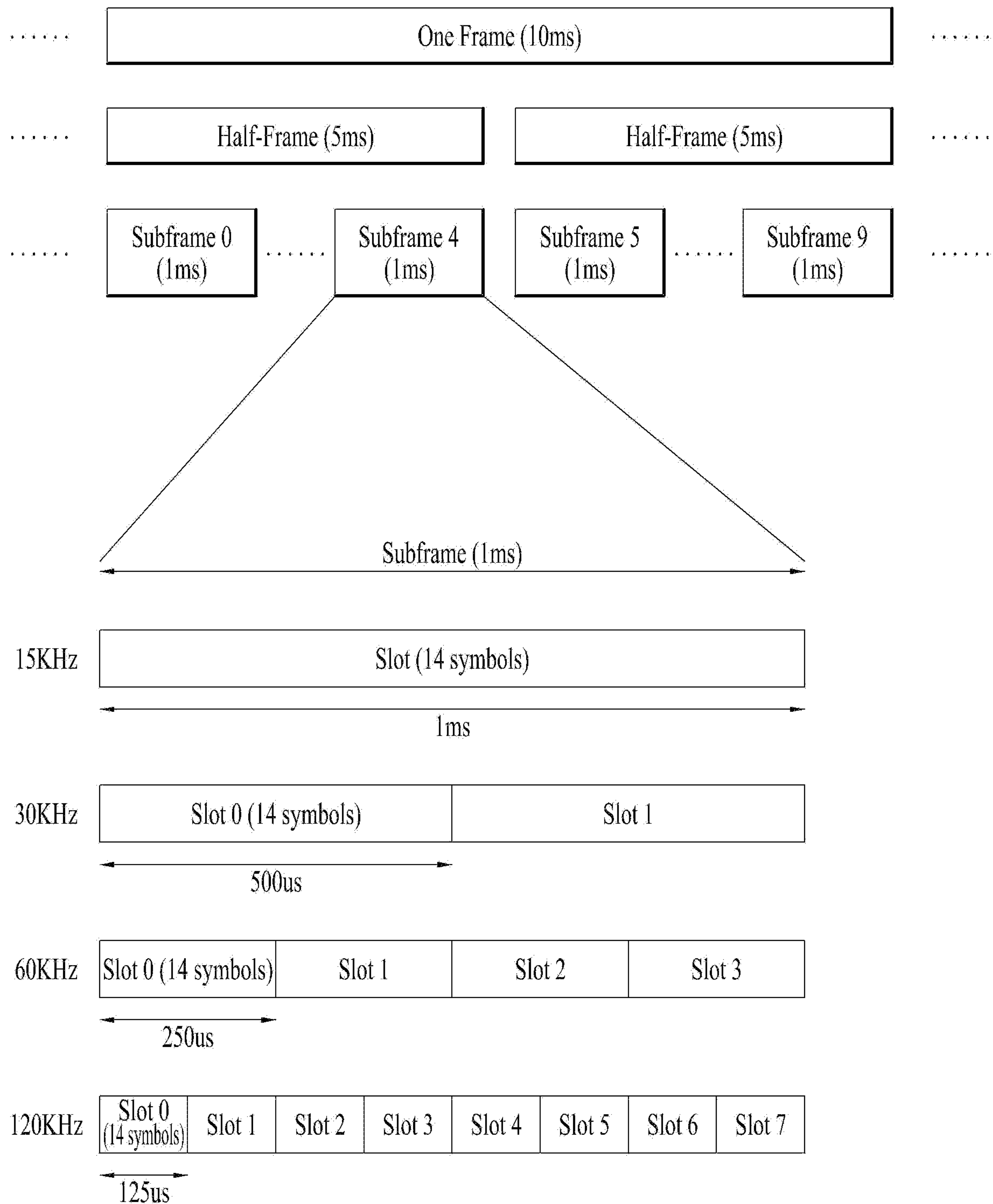
FIG. 4 illustrates a radio frame structure.

FIG. 4 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 2 exemplarily illustrates that the number of symbols per slot, the number of slots per frame, and the number of slots per subframe vary according to SCSs in a normal CP case.

TABLE 2

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* Nslotsymb: number of symbols in a slot
* Nframe, uslot: number of slots in a frame
* Nsubframe, uslot: number of slots in a subframe Table 3 illustrates that the number of symbols per slot, the number of slots per frame, and the number of slots per subframe vary according to SCSs in an extended CP case.

TABLE 3

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners.

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 5:
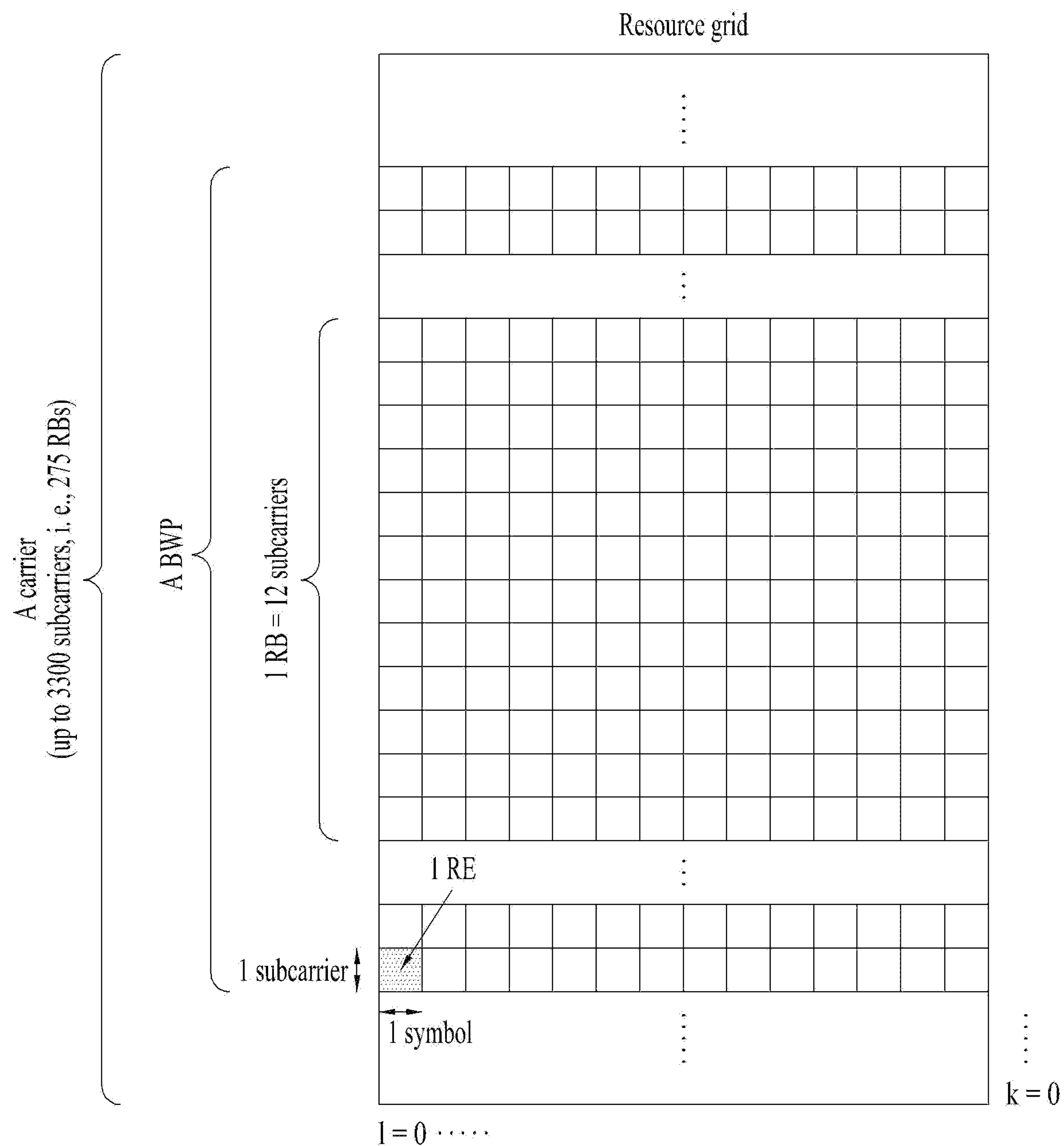
FIG. 5 illustrates a resource grid during the duration of a slot.

FIG. 5 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 6:
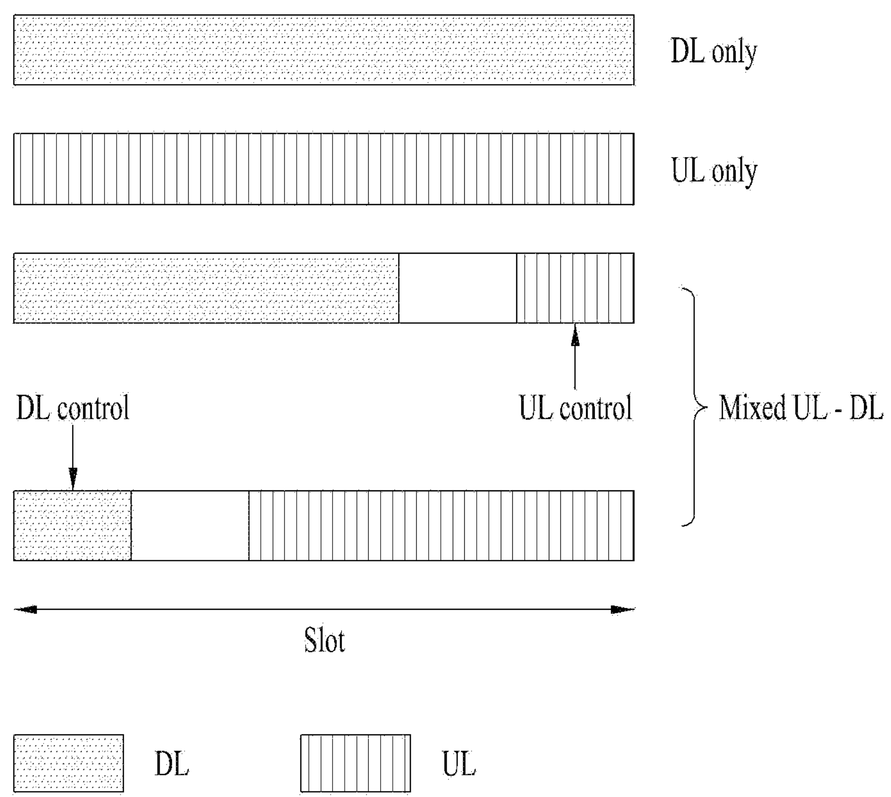
FIG. 6 illustrates a self-contained slot structure.

FIG. 6 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

–DL region+Guard period (GP)+UL control region

–DL control region+GP+UL region

*DL region: (i) DL data region, (ii) DL control region+DL data region

*UL region: (i) UL data region, (ii) UL data region+UL control region

Figure 7:
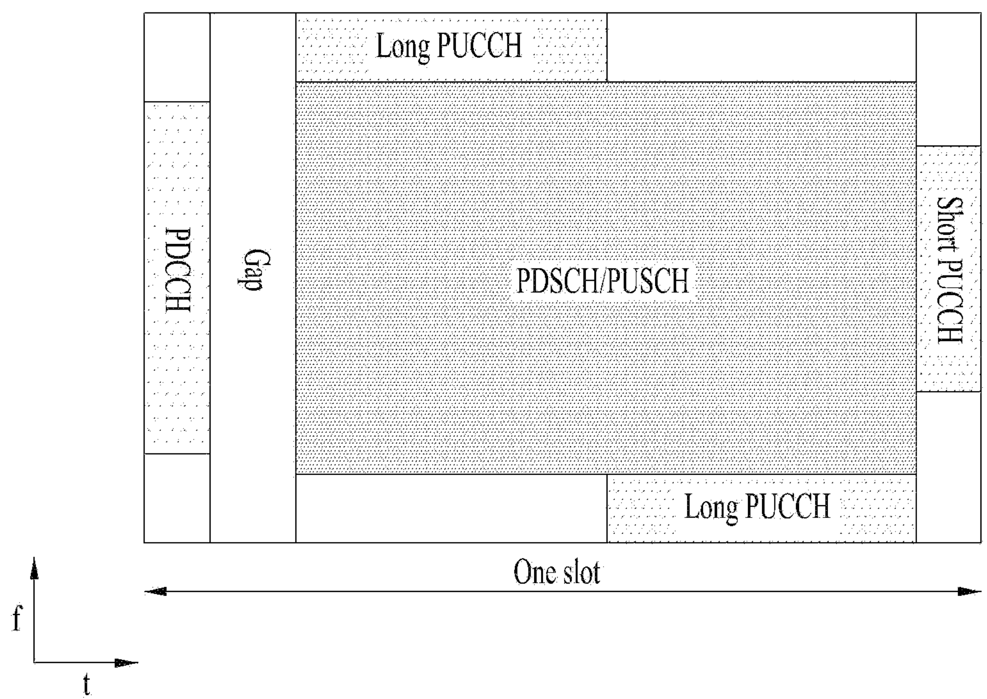
FIG. 7 illustrates mapping of physical channels in a self-contained slot.

FIG. 7 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.

monitoringSlotPeriodicityAndOffset: this indicates a PDCCH monitoring periodicity (on a slot basis) and a PDCCH monitoring period offset (on a slot basis).

monitoringSymbolsWithinSlot: this indicates PDCCH monitoring symbols in a slot (e.g., first symbol(s) in the CORESET).

nrofCandidates: this denotes the number of PDCCH candidates for each AL={1, 2, 4, 8, 16} (one of 0, 1, 2, 3, 4, 5, 6, and 8).

*An occasion (e.g., time/frequency resource) for monitoring PDCCH candidates is defined as a PDCCH (monitoring) occasion. One or more PDCCH (monitoring) occasions may be configured in a slot.

Table 4 shows the characteristics of each SS.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 shows DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel Multiple input multiple output (MIMO)-related feedback information includes an RI and a PMI.

Table 6 illustrates exemplary PUCCH formats. PUCCH formats may be divided into short PUCCHs (Formats 0 and 2) and long PUCCHs (Formats 1, 3, and 4) based on PUCCH transmission durations.

TABLE 6

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | OP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner Recently, the 3GPP standardization organization is in the process of standardizing a 5G wireless communication system named NR (New RAT). The 3GPP NR system supports a plurality of logical networks in a single physical system and is designed to support services (e.g., eMBB, mMTC, URLLC, etc.) having various requirements by changing the transmission time interval (TTI) and OFDM numerology (e.g., OFDM symbol duration, subcarrier spacing (SCS)). As data traffic has rapidly increased due to the recent emergence of smart devices, utilizing unlicensed bands for cellular communication in the 3GPP NR system is considered as in the licensed-assisted access (LAA) of the existing 3GPP LTE system. However, unlike the LAA, an NR cell in the unlicensed band (hereinafter, NR UCell) aims at a standalone (SA) operation. As an example, PUCCH, PUSCH, and PRACH transmissions may be supported in the NR UCell.

In an NR system to which various embodiments of the present disclosure are applicable, a frequency resource of up to 400 MHz may be allocated/supported per one component carrier (CC). When a UE configured operate in such a wideband CC always operates with a radio frequency (RF) module for the entire CCs turned on, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

Unlicensed Band System

Figure 8:
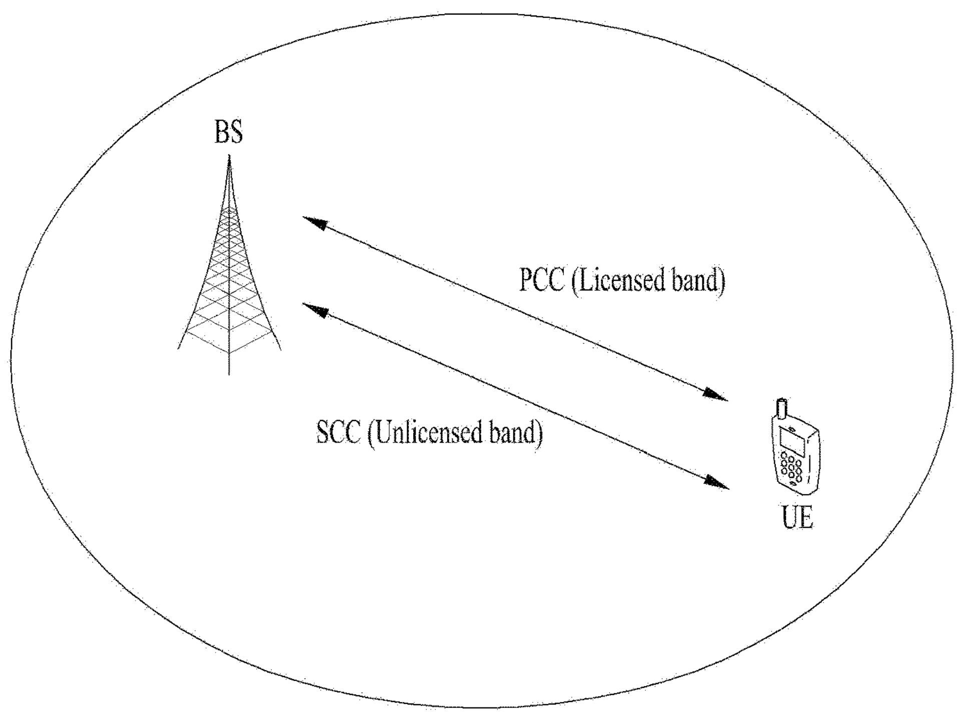
FIG. 8 illustrates a wireless communication system supporting an unlicensed band.
Figure 8:
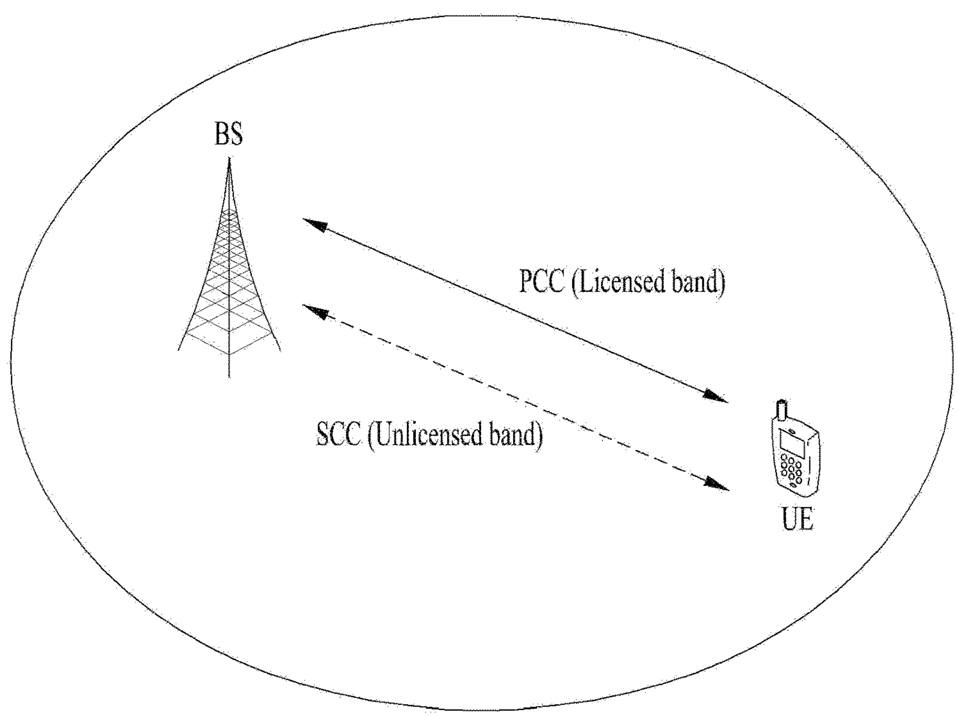

FIG. 8 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

Figure 9:
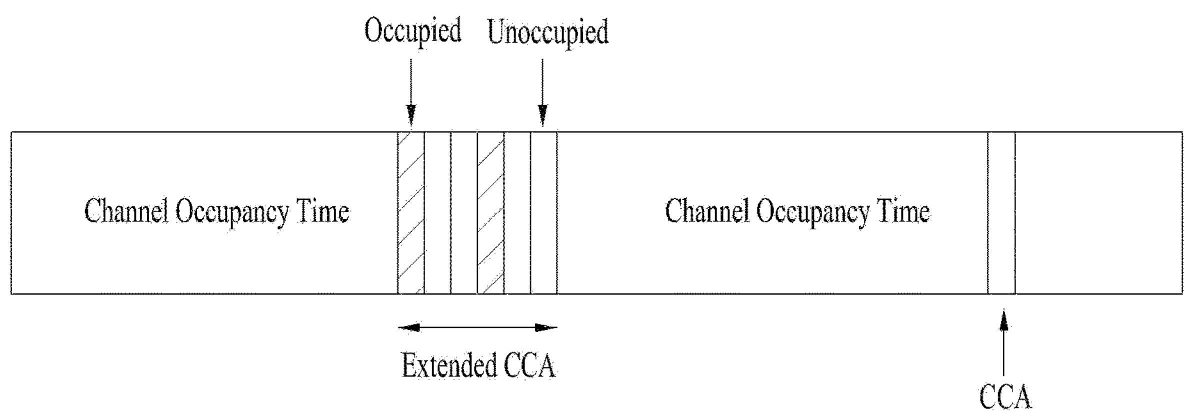
FIG. 9 illustrates an exemplary method of occupying resources in an unlicensed band.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 8(*a*) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9(*a*) corresponds to the LAA of the 3GPP LTE system. FIG. 8(*b*) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

FIG. 9 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)q$ ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)q$ ms and transmit data.

The BS may perform one of the following unlicensed band access procedures (e.g., channel access procedures (CAPs)) to transmit a DL signal in the unlicensed band.

(1) First DL CAP Method

Figure 10:
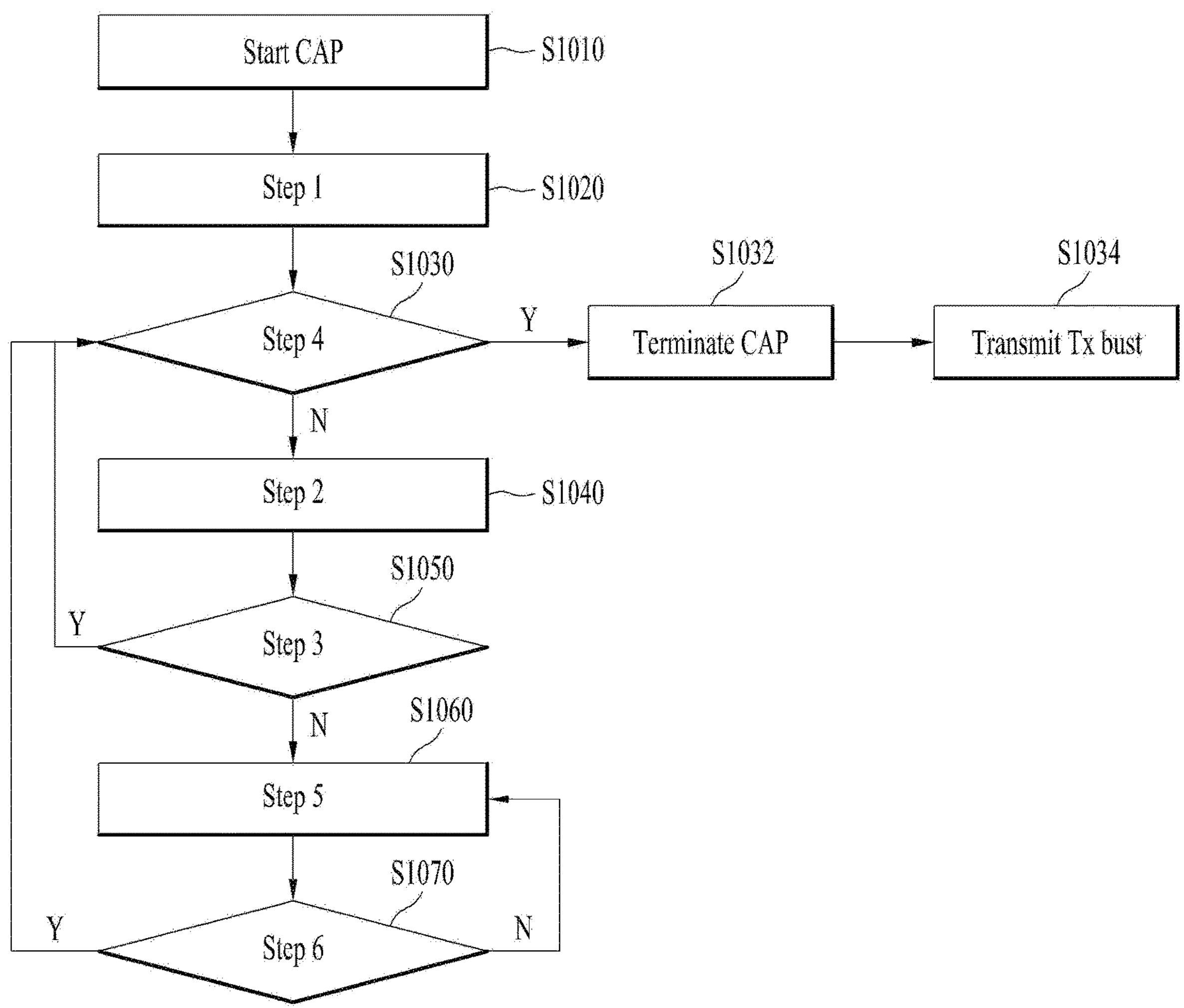
FIG. 10 illustrates an exemplary channel access procedure of a UE for DL signal transmission in an unlicensed band applicable to the present disclosure.

FIG. 10 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1010). The BS may randomly select a backoff counter N within a contention window (CW) according to step 1. N is set to an initial value Ninit (S1020). Ninit is a random value selected from the values between 0 and CWp. Subsequently, when the backoff counter value N is 0 according to step 4 (S1030; Y), the BS terminates the CAP (S1032). The BS may then perform a Tx burst transmission including transmission of a PDSCH/PDCCH/EPDCCH (S1034). On the contrary, when the backoff counter value N is not 0 (S1030; N), the BS decrements the backoff counter value by 1 according to step 2 (S1040). Subsequently, the BS checks whether the channel of U-cell(s) is idle (S1050). If the channel is idle (S1050; Y), the BS determines whether the backoff counter value is 0 (S1030). On the contrary, when the channel is not idle, that is, the channel is busy (S1050; N), the BS determines whether the channel is idle during a longer defer duration Td (25 usec or longer) than a slot duration (e.g., 9 usec) according to step 5 (S1060). If the channel is idle during the defer duration (S1070; Y), the BS may resume the CAP. The defer duration may include a 16-usec duration and the immediately following mp consecutive slot durations (e.g., each being 9 usec). On the contrary, if the channel is busy during the defer duration (S1070; N), the BS re-checks whether the channel of the U-cell(s) is idle during a new defer duration by performing step S1060 again.

Table 7 illustrates that mp, a minimum CW, a maximum CW, a maximum channel occupancy time (MCOT), and an allowed CW size applied to a CAP vary according to channel access priority classes.

TABLE 7

| Channel Access Priority Class (p) | $m_p$ | $CW_{min,p}$ | $CW_{max,p}$ | $T_{ultcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration Tdrs=25 us. Tdrs includes a duration Tf (=16 us) following one sensing slot duration Tsl (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 11:
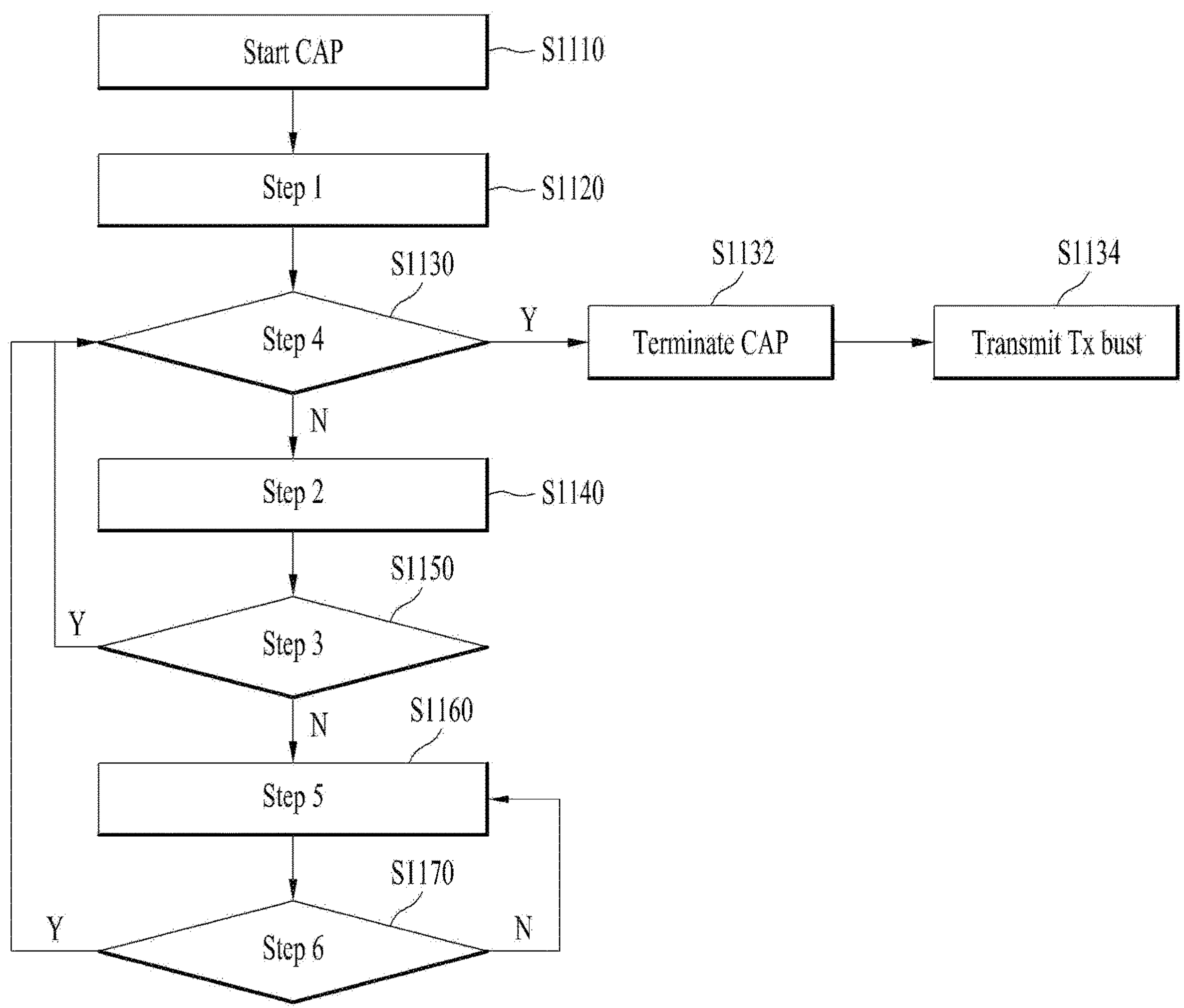
FIG. 11 illustrates an exemplary channel access procedure of a UE for UL signal transmission in an unlicensed band applicable to the present disclosure.

FIG. 11 is a flowchart illustrating UE's Type 1 CAP operation for UL signal transmission.

To transmit a signal in the U-band, the UE may initiate a CAP (S1110). The UE may randomly select a backoff counter N within a contention window (CW) according to step 1. In this case, N is set to an initial value Ninit (S1120). Ninit may have a random value between 0 and CWp. If it is determined according to step 4 that the backoff counter value (N) is 0 (YES in S1130), the UE terminates the CAP (S1132). Then, the UE may perform Tx burst transmission (S1134). If the backoff counter value is non-zero (NO in S1130), the UE decreases the backoff counter value by 1 according to step 2 (S1140). The UE checks whether the channel of U-cell(s) is idle (S1150). If the channel is idle (YES in S1150), the UE checks whether the backoff counter value is 0 (S1130). On the contrary, if the channel is not idle in S1150, that is, if the channel is busy (NO in S1150), the UE checks whether the corresponding channel is idle for a defer duration Td (longer than or equal to 25 usec), which is longer than a slot duration (e.g., 9 usec), according to step 5 (S1160). If the channel is idle for the defer duration (YES in S1170), the UE may resume the CAP. Here, the defer duration may include a duration of 16 usec and mp consecutive slot durations (e.g., 9 usec), which immediately follows the duration of 16 usec. If the channel is busy for the defer duration (NO in S1170), the UE performs step S1160 again to check whether the channel is idle for a new defer duration.

Table 8 shows that the values of mp, a minimum CW, a maximum CW, an MCOT, and allowed CW sizes, which are applied to the CAP, vary depending on channel access priority classes.

TABLE 8

| Channel Access Priority Class (p) | $m_p$ | $CW_{min,\,p}$ | $CW_{max,\,p}$ | $T_{ulmcot,\,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set CWp to CWmin, p for every priority class p∈{1,2,3,4}. Otherwise, the UE may increase CWp for every priority class p∈{1,2,3,4} to a next higher allowed value.

A reference subframe (or reference slot) nref may be determined as follows.

When the UE receives a UL grant in a subframe (or slot) ng and performs transmission including a UL-SCH, which has no gaps and starts from a subframe (or slot) n0, in subframes (or slots) $n_0, n_1, \ldots n_w$ (here, the subframe (or slot) nw is the most recent subframe (or slot) before a subframe ng-3 in which the UE has transmitted the UL-SCH based on the Type 1 CAP), the reference subframe (or slot) nref may be the subframe n0.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period Tshort_ul of 25 us. Tshort_ul includes a duration Tf of 16 us immediately followed by one slot duration Tsl of 9 us. Tf includes an idle slot duration Tsl at the start thereof.

In NR-U, when the BW of a BWP assigned to the BS or UE is greater than or equal to 20 MHz, the BWP may be divided by an integer multiple of 20 MHz for fair coexistence with Wi-Fi to perform LBT in units of 20 MHz and transmit each signal. A frequency unit in which LBT is performed is referred to as a channel or an LBT sub-band. 20 MHz has a meaning as a frequency unit in which LBT is performed, and various embodiments of the present disclosure are not limited to a specific frequency value such as 20 MHz.

In some implementations, the proposed method of the present disclosure is non-limited to an LBT based U-band operation only but is similarly applicable to an L-band (or U-band) operation not accompanied by LBT. In the following description, a band may be compatible with a CC/cell. Moreover, a CC/cell (index) may be replaced by a BWP (index) configured in the CC/cell or a combination of a CC/cell (index) and a BWP (index).

Dynamic Slot Format Indication Information (e.g., DCI Format 2_0)

Basically, a slot format may represent a use of each symbol unit included in the corresponding slot, and each symbol may represent any one of downlink (DL), uplink (UL), and flexible (F). The slot format-related information may be transmitted as one or more of the following signals:

- static or semi-static slot format indication (SFI) (e.g., TDD-UL-DL-ConfigurationCommon and/or TDD-UL-DL-ConfigDedicated, etc.) through higher layer signaling;
- measurement-related scheduling signal (e.g., measurement-related signals configured by UE-specific RRC signaling);
- dynamic SFI (e.g., a signal transmitted through DCI format 2_0); and
- UE-specific data transmission scheduling signal (e.g., UE-specific DCI).

Static or semi-static SFI may be indicated by cell-specific RRC signaling (e.g., TDD-UL-DL-ConfigurationCommon) or UE-specific RRC signaling (e.g., TDD-UL-DL-ConfigDedicated). The measurement related signal may be indicated through UE-specific RRC signaling, and the corresponding signal may indicate periodic/semi-persistent CSI-RS, periodic CSI report, periodic/semi-persistent SRS, and the like for CSI reporting. UE-specific data transmission related signals may include UE-specific DCI for triggering a PUCCH along with A/N messages for PDSCH, PUSCH, and PDSCH, and a DCI for triggering aperiodic measurement related such as aperiodic CSI-RS, aperiodic SRS, etc.

The slot formats may include a slot format for 0 (zero switching point), a slot format for 1 (one switching point), and/or a slot format of 2 (two switching points).

The slot format for the switching point '0' may include 14 DL symbols, 14 flexible symbols, or 14 UL symbols. The slot format for the switching point '1' may start with one or more DL symbols, may be ended with one or more UL symbols, and may be configured to include one or more flexible symbols and one or more DL/UL symbols disposed between the DL and UL symbols. The slot format for the switching point '2' may include first seven symbols and second seven symbols. The first seven symbols may start with one or more DL symbols in a manner that one or more UL symbols are ended at the seventh symbol. The second seven symbols may start with one or more DL symbols, and may be ended with one or more UL symbols. Zero or more flexible symbols may be included in the first seven symbols, and zero or more flexible symbols may be included in the second seven symbols.

A maximum of 256 slot formats may be defined, and their configurations are defined by standard documents such as TS 38.211. A UE-specific SFI table may be configured by higher layer signaling based on the maximum of 256 slot formats, and the UE may receive a specific index value included in the UE-specific SFI table through DCI format 2_0 (or group-common PDCCH).

The UE may determine a slot format based on the following priority for signals transmitting the above-mentioned slot format-related information. More specifically, when the UE receives the slot format-related information through a plurality of signals, the UE may consider indication information of the next priority so as to confirm the use of a symbol serving as a flexible symbol by a higher-priority signal.

The priorities of such signals may be arranged in the following order:—slot formation information through cell-specific higher layer signaling (e.g., TDD-UL-DL-ConfigurationCommon)>slot format information through UE-specific higher layer signaling (e.g., TDD-UL-DL-ConfigDedicated)>slot format information (e.g., DCI format 2_0) through a group-common PDCCH>UE-specific data transmission scheduling information>measurement related scheduling information.

Therefore, when a specific symbol in the slot is signaled to the UE as DL/UL signals through cell-specific RRC signaling or UE-specific RRC signaling, the UE does not expect that DCI format 2_0 (or a group-specific PDCCH including DCI format 2_0) will determine a specific symbol to be a UL/DL symbol or a flexible symbol. If a specific symbol in the slot is determined to be a flexible symbol through DCI format 2_0 (or a group-specific PDCCH including DCI format 2_0), the UE may transmit and receive related signals in the specific symbol only upon receiving separate scheduling information (e.g., UE-specific scheduling DCI). Unless additional scheduling information is received, the UE may not transmit and receive signals in the specific symbol.

DCI format 2_0 used to indicate the slot format as described above may transmit the following information along with a CRC (Cyclic Redundancy Check) scrambled by a Slot Format Indicator Random Network Temporary Identifier (SFI-RNTI).

SFI (Slot Format Indicator) #1, SFI #2, . . . , SFI #N

The size of DCI format 2_0 may be set to a maximum of X bits (e.g., 128 bits) based on higher layer signaling.

Various Embodiments of the Present Disclosure

Hereinafter, various embodiments of the present disclosure will be described in detail based on the technical idea described above.

The terms used in the description of various embodiments of the present disclosure may be as follows.

TBS: Transport Block Size

SLIV: SLIV is an abbreviation of a starting and length indicator value (SLIV). The SLIV may refer to an indication field indicating a start symbol index in a slot of PDSCH and/or PUSCH and the number of symbols included in the slot, and is loaded on a PDCCH that schedules the corresponding PDSCH and/or PUSCH.

BWP: BWP is an abbreviation of a BandWidth Part (BWP). The BWP may include consecutive resource blocks (RBs) on the frequency axis, and may correspond to one numerology (e.g., sub-carrier spacing, CP length, and/or slot/mini-slot duration). In addition, although the plurality of BWPs is configured in one carrier (but the number of BWPs per carrier may also be restricted), the number of activated BWPs per carrier may be limited to a specific number of BWPs (e.g., one BWP).

CORESET: CORESET is an abbreviation of a COntrol REsourse SET. The CORESET may refer to a time-frequency resource domain to which a PDCCH can be transmitted, and the number of CORESETs per BWP may be restricted.

REG: Resource element group

SFI: SFI is an abbreviation of a Slot Format Indicator. The SFI may refer to an indicator for indicating a symbol level DL/UL direction of symbols included in specific slot(s), and may be transmitted over a group-common PDCCH.

DL burst: Signals consecutively transmitted on a time axis without a gap in an unlicensed band may be referred to as a transmission (Tx) burst. DL burst may denote DL signals consecutively transmitted on a time axis.

UL grant DCI: UL grant DCI may refer to DCI for UL grant. For example, UL grant DCI may refer to DCI formats such as DCI formats 0_0 and 0_1 and may be transmitted over a PDCCH.

DL assignment/grant DCI: This means a DCI for a DL grant. For example, DL assignment/grant DCI may refer to DCI formats 1_0 and 1_1, and may be transmitted over a PDCCH.

PUSCH: PUSCH is a physical layer UL channel for UL data transmission.

Slot: Slot may refer to a basic time unit (TU) (or a time interval) for data scheduling. The slot may include a plurality of symbols. Here, the symbol may include OFDM-based symbols (e.g., CP-OFDM symbol, DFT-s-OFDM symbol, etc.). In the present specification, symbols, OFDM-based symbols, OFDM symbols, CP-OFDM symbols, and DFT-S-OFDM symbols can be replaced with each other.

Channel: Channel may refer to a carrier composed of consecutive sets (consecutive aggregates) of RBs that enable a channel access procedure to be performed in a shared spectrum, or may refer to a part of the carrier. For example, the channel may refer to a frequency unit in which LBT is performed. In the following description, the term "channel" may be used interchangeably with "LBT subband".

LBT is performed for Channel X/about Channel X: This means that LBT is performed to confirm whether Channel X can be transmitted or not. For example, the CAP procedure may be performed prior to beginning of Channel-X transmission.

LBT is performed in Symbol X/about Symbol X/for Symbol X: This means that LBT is performed to confirm whether data transmission can begin from Symbol X. For example, the CAP procedure may be performed in previous symbol(s) of the symbol X.

When a frequency band unit configured to perform the CAP in the unlicensed band (U-band) is defined as CAP-BW (or LBT-BW), a band corresponding to either one carrier or one BWP may include a plurality of CAP-BWs. In this case, only when the BS performs the CAP for each CAP-BW and successfully performs the CAP in all of the CAP-BWs belonging to the carrier or BWP, DL burst transmission is performed. Otherwise, DL burst transmission may not be attempted (for brevity, referred to as Mode 1). Alternatively, a DL burst may be transmitted on a specific CAP-BW (succeeding in CAP) according to the result of CAP, or may not be transmitted on another CAP-BW (failed in CAP) (for brevity, referred to as Mode 2). During Mode 2 transmission, information about whether data is transmitted to some RBs/REs of both ends of the CAP-BW may be changed according to which one of CAP-BW was actually transmitted to a destination (in consideration of the request for in-band leakage and/or for out-of-band emission). Accordingly, the present disclosure provides a method for transmitting and receiving DL signals/channels by referring to the fact that some CAP-BWs from among the plurality of CAP-BWs belonging to the carrier or BWP can be transmitted according to the CAP result. Meanwhile, the term 'CAP-BW' may have the same meaning as the RB set. The RB set may be configured in the carrier by RRC signaling. Unless the RB set is configured in the carrier by RRC signaling, predefined values according to the frequency domains of the carriers may be used.

In the following description, signal transmission by the BS succeeding in the CAP may represent that the BS transmits signals using the CAP on the corresponding unlicensed band (or unlicensed cell) staying in the idle state. Conversely, a specific situation where the BS fails in CAP at a specific time point may represent that the corresponding unlicensed ban (or unlicensed cell) is determined to be in a busy state so that the BS is unable to transmit signals.

One UE may be configured to operate in a manner that only one carrier is configured in the unlicensed band or multiple carriers are combined (or merged) and operate in the unlicensed band. In this case, a maximum of 4 BWPs may be configured for each carrier, and only one BWP from among the four BWPs may be activated. Each active BWP bandwidth may correspond to one CAP-BW or may correspond to the plurality of CAP-BWs. For example, one CAP-BW size may have a fixed value, or may be changed according to the network (or BS) configuration. For example, the size of one CAP-BW may be fixed to 20 MHz, or may be variably configured based on higher layer signaling and/or DCI.

Figure 12:
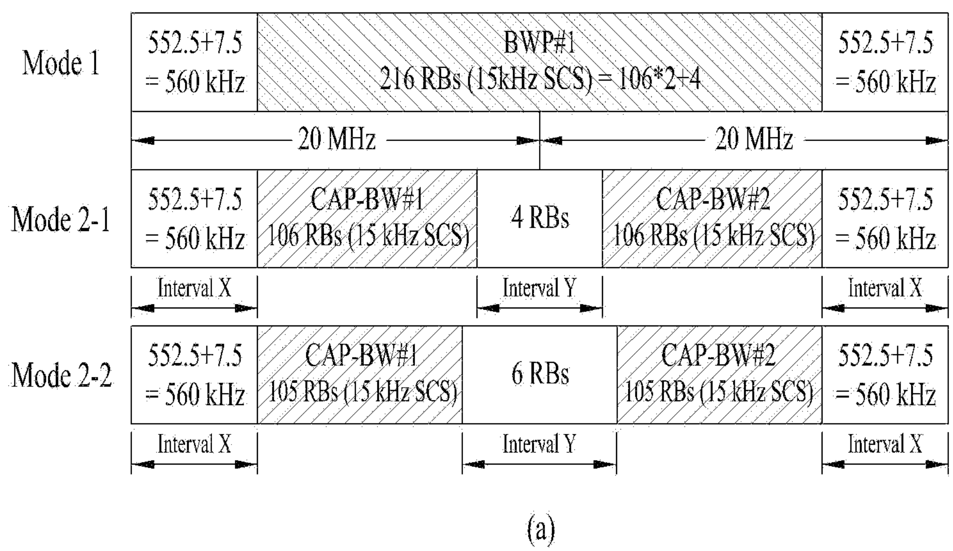
FIG. 12 is a diagram illustrating an example of a BWP configuration applicable to the embodiments of the present disclosure.
Figure 12:
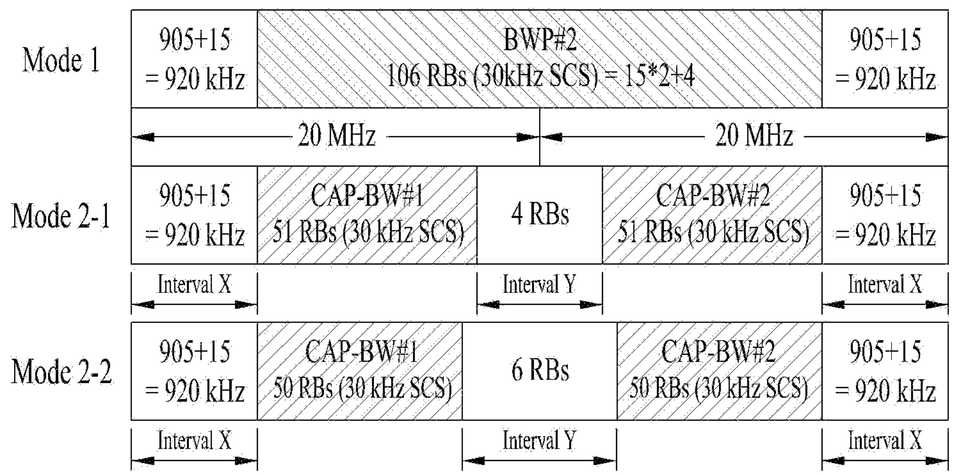

For example, as shown in FIG. 12(*a*), when a carrier or BWP corresponding to a total of 40 MHz is configured, a guard band of 560 kHz may be disposed at each of both ends of 15 kHz SCS, and a channel bandwidth corresponding to 216 RBs may be configured in 15 kHz SCS. If CAP-BW is configured/indicated/defined as 20 MHz, the BS operating in Mode 2 may be constructed such that a channel bandwidth for each CAP-BW corresponds to 106 RBs as shown in Mode 2-1, and a guard band between the CAP-BWs may be set to 4 RBs. Alternatively, as shown in Mode 2-2, the channel bandwidth for each CAP-BW may be configured to correspond to 105 RBs, and a guard band between the CAP-BWs may be set to 6 RBs.

In another example, as shown in FIG. 12(*b*), when the carrier or BWP corresponding to a total of 40 MHz is configured, a guard band of 920 kHz may be disposed at each of both ends of 30 kHz SCS, and a channel bandwidth corresponding to 106 RBs may be configured in 30 kHz SCS. If CAP-BW is configured/indicated/defined as 20 MHz, the BS operating in Mode 2 may be constructed such that a channel bandwidth for each CAP-BW corresponds to 51 RBs as shown in Mode 2-1, and a guard band between the CAP-BWs may be set to 4 RBs. Alternatively, as shown in Mode 2-2, the channel bandwidth for each CAP-BW may be configured to correspond to 50 RBs, and a guard band between the CAP-BWs may be set to 6 RBs.

As shown in FIG. 12, each of the guard bands disposed at both ends of the carrier or BWP may be referred to as "Interval X", and a guard band between the CAP-BWs may be referred to as "Interval Y". Although the example of the present disclosure shows that two CAP-BWs are constructed in one carrier or one BWP, the same method can also be extended to other carriers or BWPs corresponding to two or more CAP-BWs. At this time, the value of "Interval Y" may be set to a different value depending on which CAP-BWs are used as both end values of "Interval Y".

When multiple CAP-BWs are configured in any carrier or BWP, the size of "Interval X" section, the number of RBs constructing each CAP-BW, and/or the size of "Interval Y" (disposed between CAP-BWs) may be predefined or may be configured by higher layer signaling such as RRC signaling. When the BS operating in Mode 2 (Mode 1) performs data transmission in both of CAP-BW #1 and CAP-BW #2, the following BS types for "Interval Y" may be used:

i) BS (base station) (for brevity, hereinafter referred to as Type 1) configured to perform data transmission without generating the Interval Y in all DL bursts;

ii) BS (for brevity, hereinafter referred to as Type 2) incapable of transmitting DL signals/channels on the Interval Y for all DL bursts;

iii) BS (for brevity, hereinafter referred to as Type 3) incapable of transmitting DL signals/channels on the Interval Y only for some parts of a front part of DL bursts, and capable of transmitting DL signals/channels for the remaining sections other than the front part of the DL bursts;

Type information of the BS may be signaled through higher layer signaling or RRC signaling (cell-specific or UE-specific signals such as MIB(Master Information Block)/SIB (System Information Block)). Specifically, the Type-3 BS may indicate a time period T (e.g., T denotes a first slot) where DL signals/channels are not transmitted on the Interval Y of the DL burst through higher layer signaling such as RRC signaling. In addition, the fact that signals belong to or do not belong to the time period T on the DL burst may be signaled through DCI. The corresponding DCI may include time and/or frequency information occupied by the BS, after completion of a successful CAP, and may be a group-common (GC) DCI. Specifically, the fact that signals are not included in the time period T on the DL burst may be signaled through DCI. When the DCI is transmitted through a specific slot, the other fact that the corresponding slot and/or the next N slot(s) are included or not included in the time period T may be signaled. The N value may be predefined, may be configured/instructed by higher layer signaling such as RRC/MAC signaling, may be signaled through DCI, or may be configured/indicated through a combination thereof. If the Interval Y is set to zero '0', this means that the corresponding BS operates in Mode 1.

That is, in Mode 1, when the CAP is successfully performed in all CAP-BWs, DL burst transmission is possible, so that Mode 1 can be defined as an operation state where DL burst transmission can be performed without a guard band as in Type 1 (That is, DL signals can be transmitted to the frequency band corresponding to Interval Y). In Mode 2, it is impossible to recognize which CAP-BW will be used for the successful CAP, so that type information indicating whether the guard band is used or not according to the BS capability can be defined in Mode 2. For example, a scenario where Mode 1 and Mode 2 have the same type 1 may indicate the case where the CAP was successfully performed in all CAP-BWs. Referring to FIG. 12, when any one of two CAP-BWs fails in CAP, the BS in Mode 1 does not transmit the DL burst. In contrast, when any one of CAP-BWs succeeds in CAP, the BS in Mode 2 can transmit the DL burst in the successful CAP-BW, so that the DL burst is not transmitted to the guard band.

The present disclosure proposes a method for transmitting and receiving a DL control/data channel and/or a DL signal according to the operation modes and/or types of the base stations (BSs).

(1) Receiver

[Method #1] CORESET resource allocation method considering "Interval Y"

Figure 13:
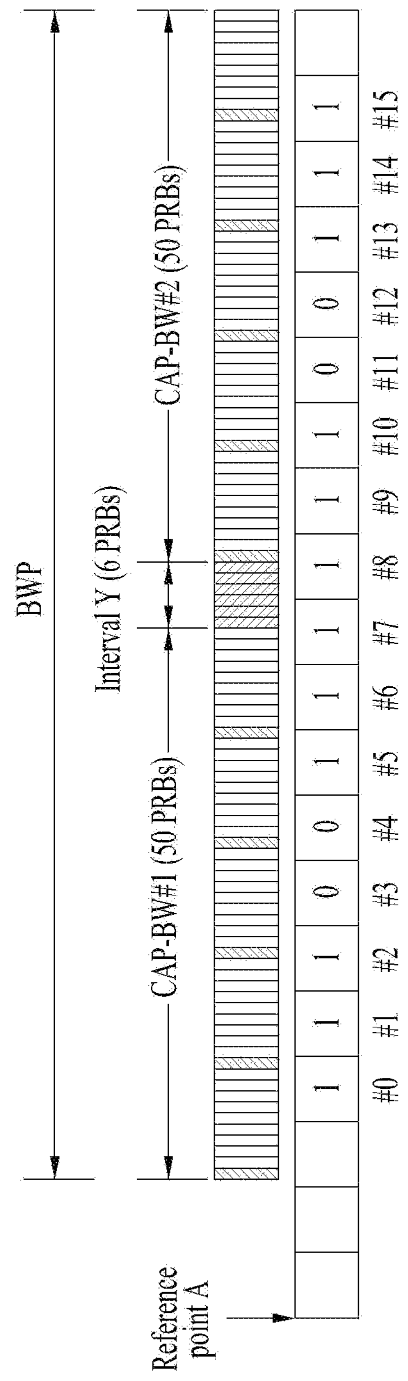
FIGS. 13 to 16 are diagrams illustrating examples of resource allocation configurations applicable to the embodiments of the present disclosure.

In Rel-15 NR, frequency resources of the CORESET may be allocated based on a bitmap of 6 RBs. Referring to the resource allocation method shown in FIG. 13, a reference point A where the common RB index #0 is started may be configured by RRC signaling, and a start RB index (i.e., in FIG. 13, a start RB index of 106 RBs) for each BWP and the number of RBs corresponding to a bandwidth of the BWP may be configured. When a grid of 6 RBs is drawn from the common RB index #0 and all 6 RBs are included in the corresponding BWP, bits on the bitmap corresponding to the corresponding 6 RBs can be indicated. As shown in FIG. 13, according to the above-mentioned rules, the CORESET frequency resources can be allocated to the BWP to which 106 RBs are allocated, through a total of 16-bit bitmap. Here, if bitmap information is set to '1', the corresponding 6 RBs correspond to CORESET resources. If bitmap information is set to '0', the corresponding 6 RBs may not correspond to the CORESET resources. In the present disclosure, information of '1' and '0' can be interpreted as described above, but the same method can be applied even when the information of '1' and '0' is interpreted vice versa. In the present disclosure, 16-bit bitmap or 14-bit bitmap to be described later is only an exemplary bitmap size corresponding to the configured BWP size, and the bitmap size is not limited to 16 bits or 14 bits.

Figure 14:
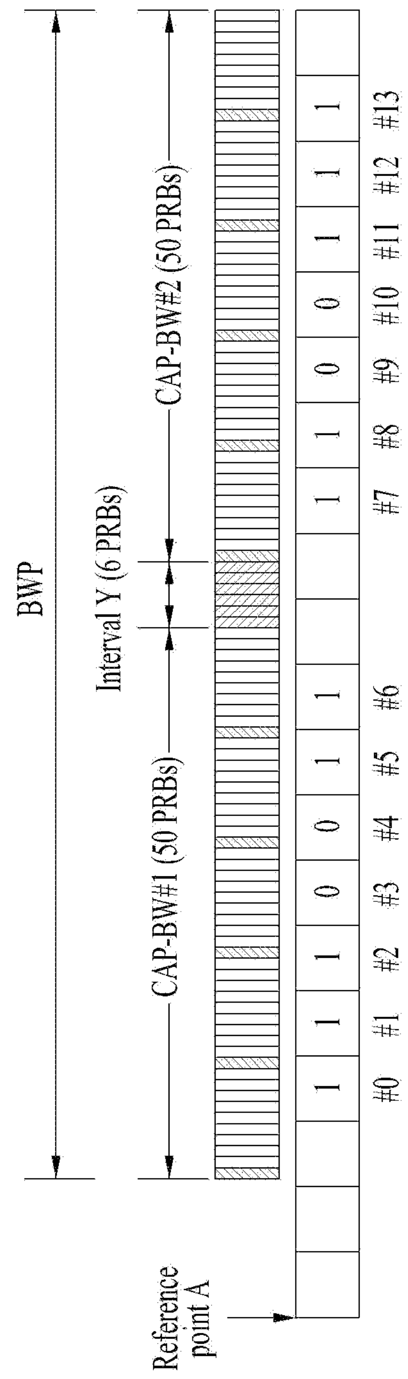

[Method #1-1] The UE assumes that bits corresponding to 6 RBs overlapping the Interval Y are not applied to CORESET resource allocation. That is, in the grid of 6 RBs as shown in FIG. 13, it is assumed that bitmap information corresponding to bits #7 and #8 is not present, and it is also assumed that a total bitmap size is 14 bits as shown in FIG. 14 rather than 16 bits. Information about whether a 16-bit bitmap shown in FIG. 13 is assumed in a specific BWP or information about whether a 14-bit bitmap is assumed in a specific BWP may be separately signaled through RRC signaling. Alternatively, if the BS is configured to operate in Mode 1, and if the BS is configured to operate in Mode 2 with the 16-bit bitmap, it can be expected that the size of 14-bit bitmap can be recognized by the UE. Alternatively, if the BS is configured to operate in Type 1, and if the BS is configured to operate in Type 2 with the 16-bit bitmap, it can be expected that the size of 14-bit bitmap can be recognized by the UE. If the BS is operated to operate in Type 3, the UE may receive all of the 14-bit bitmap and the 16-bit bitmap, may utilize resource allocation information of the 14-bit bitmap when monitoring a PDCCH related to the corresponding CORESET during the period T of the DL burst, and may utilize resource allocation information of the 16-bit bitmap when monitoring a PDCCH related to the corresponding CORESET during the remaining periods other than the period T of the DL burst.

Figure 15:
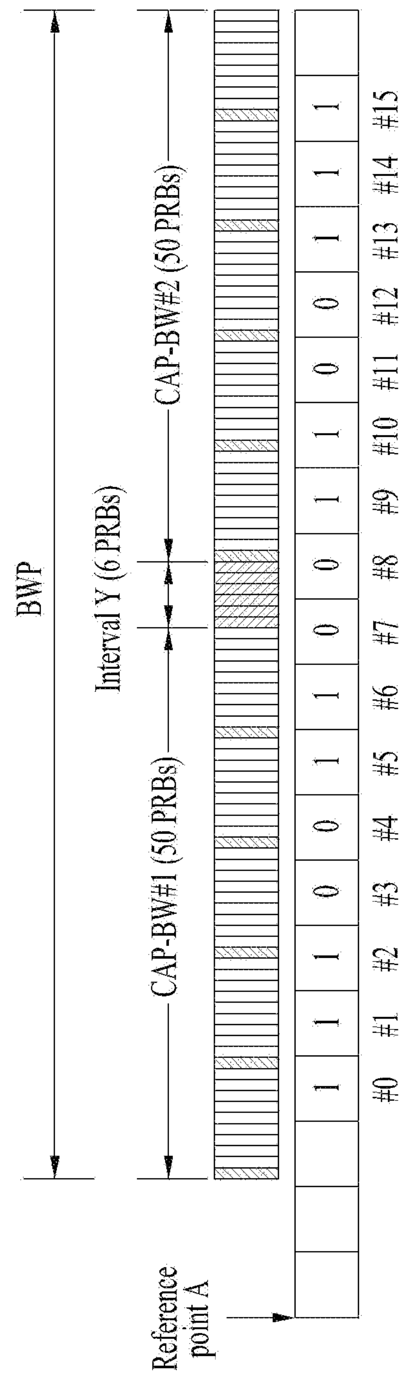

[Method #1-2] In Method #1-2, the UE may expect that each bit corresponding to 6 RBs overlapping the Interval Y is set to '0' (Alternatively, although each bit is set to '1', the UE may regard the bit as '0'). In the present disclosure, RBs, which are expected to be set to '0' or to be regarded to be '0', may mean that the corresponding RBs are excluded from REG-to-CCE mapping, or may mean that CCEs including the corresponding RBs are excluded from CCE-to-PDCCH mapping. In addition, when a PDSCH rate-matching pattern considering CORESET resources is configured, RBs, which are expected to be set to '0' or to be regarded to be '0', may be recognized as resources that are not considered in the rate-matching (i.e., RBs may not be identical to CORESET resources). For example, in the grid of 6 RBs shown in FIG. 13, it is assumed that bitmap information corresponding to bits #7 and #8 are always set to '0' and a total bitmap size remains at 16-bits (i.e., in association with RBs #7 and #8 corresponding to the Interval Y, even when the configured bit value is '1', the UE may interpret the corresponding bit to be '0'). That is, information about whether the 16-bit bitmap shown in FIG. 13 will be utilized in a specific BWP, information about whether the UE expects that information corresponding to bits #7 and #8 (shown in FIG. 15) is always '0', or information about whether the UE regards the information to be '0' may be signaled through separate RRC signaling. Alternatively, if the BS is configured to operate in Mode 1, the UE may utilize all information of the 16-bit bitmap. If the BS is configured to operate in Mode 2, the UE may expect that information corresponding to bits #7 and #8 is always '0' or may regard the corresponding information to be '0'. Alternatively, if the BS is configured to operate in Type 1, the UE may utilize all information of the 16-bit bitmap. If the BS is configured to operate in Type 2, the UE may expect that information corresponding to bits #7 and #8 is always '0' or may regard the corresponding information to be '0'. If the BS is configured to operate in Type 3, the UE may utilize all information of the 16-bit bitmap when monitoring a PDCCH related to the corresponding CORESET during the remaining periods other than the period T of the DL burst. When monitoring a PDCCH related to the corresponding CORESET during the period T of the DL burst, information corresponding to bits #7 and #8 on the 16-bit bitmap is always expected to be '0' or is regarded to be '0'.

Method #1-2 and Method #1-1 described above are different in total bitmap size. In Method #1-2, two bits corresponding to #7 and #8 are always present, so that a total bitmap size is 16 bits, and bits corresponding to #7 and #8 are interpreted differently depending on the mode or type of the BS.

[Method #1-3] Method #1-1 or Method #1-2 may be applied according to a search space, a DCI format, and/or RNTI linked to the corresponding CORESET. For example, as in Method #1-1, upon receiving all bitmaps of two sizes, when monitoring a PDCCH related to a specific (or a predefined or separately configured) search space, DCI format, and/or RNTI, resource allocation information on the 14-bit bitmap can be used. When monitoring a PDCCH related to the remaining (or a predefined or separately configured) search space, DCI format, and/or RNTI, resource allocation information on the 16-bit bitmap can be used. As another example, as in Method #1-2, when monitoring a PDCCH related to a specific (or a predefined or separately configured) search space, DCI format, and/or RNTI, all information of the 16-bit bitmap may be utilized. When monitoring a PDCCH related to the remaining (or predefined or separately configured) search space, DCI format, and/or RNTI, all information of the 16-bit bitmap may be utilized, information corresponding to bits #7 and #8 on the 16-bit bitmap is always expected to be '0' or is regarded to be '0'. Specifically, when monitoring a PDCCH related to a DCI format including time and/or frequency axis resource information occupied by the BS having successfully performed the CAP, information corresponding to bits #7 and #8 on the 16-bit bitmap may be regarded to be '0' and the BS performs such monitoring. When monitoring a PDCCH related to the remaining DCI formats other than the above DCI format, the BS can perform monitoring using all information of the 16-bit bitmap.

[Method #1-4] If a UE recognizes that any one CAP-BW from among the CAP-BW #1 and CAP-BW #2 was not transmitted through separate signaling (e.g., GC-DCI, UE-specific DCI, or DMRS sequence), Method #1-1 or Method #1-2 may be applied to the UE. For example, as in Method #1-1, PDCCH monitoring can be performed by utilizing only resource allocation information corresponding to the transmitted CAP-BW from among resource allocation information of the 14-bit bitmap. As another example, as shown in Method #1-2, information corresponding to bits #7 and #8 of the 16-bit bitmap is always expected to be '0' or is regarded to be '0', and PDCCH monitoring can be performed by utilizing only resource allocation information corresponding to the transmitted CAP-BW.

[Method #1-5] In NR-U, CORESET index '0' may be configured to perform system information reception, etc. A single synchronization raster may be defined for each CAP-BW of a specific band (e.g., 5 GHz band) in which the NR-U system operates, and a channel raster may be predefined according to the frequency band and the carrier BW. In addition, frequency resources of the CORESET index '0' may be defined as 96 PRBs at 15 kHz SCS, and may be defined as 48 PRBs at 30 kHz SCS. If the position of the CORESET index 0 is fixed in a specific frequency band, CORESET allocation bitmap information included in the corresponding CAP-BW can be aligned (or adjusted) with the position of the corresponding CORESET index '0'. Alternatively, when candidates for the location of the CORESET index 0 can be defined in a specific frequency band, CORESET allocation bitmap information included in the corresponding CAP-BW may be aligned with the location of a specific candidate (e.g., the location of a candidate where the corresponding CAP-BW and the RB grid are aligned with each other, and the location of a candidate located closest to the RB grid of the corresponding CAP-BW) from among the plurality of candidates corresponding to the CORESET index 0. For example, in FIG. 13, if the CORESET index '0' corresponding to CAP-BW #1 is set to a 49-th PRB from the second PRB from among 50 PRBs contained in the CAP-BW #1, the first PRB from among 6 PRBs corresponding to the first bit of the CORESET bitmap can be aligned with the second PRB from among 50 PRBs contained in CAP-BW #1, and can then be interpreted.

Figure 16:
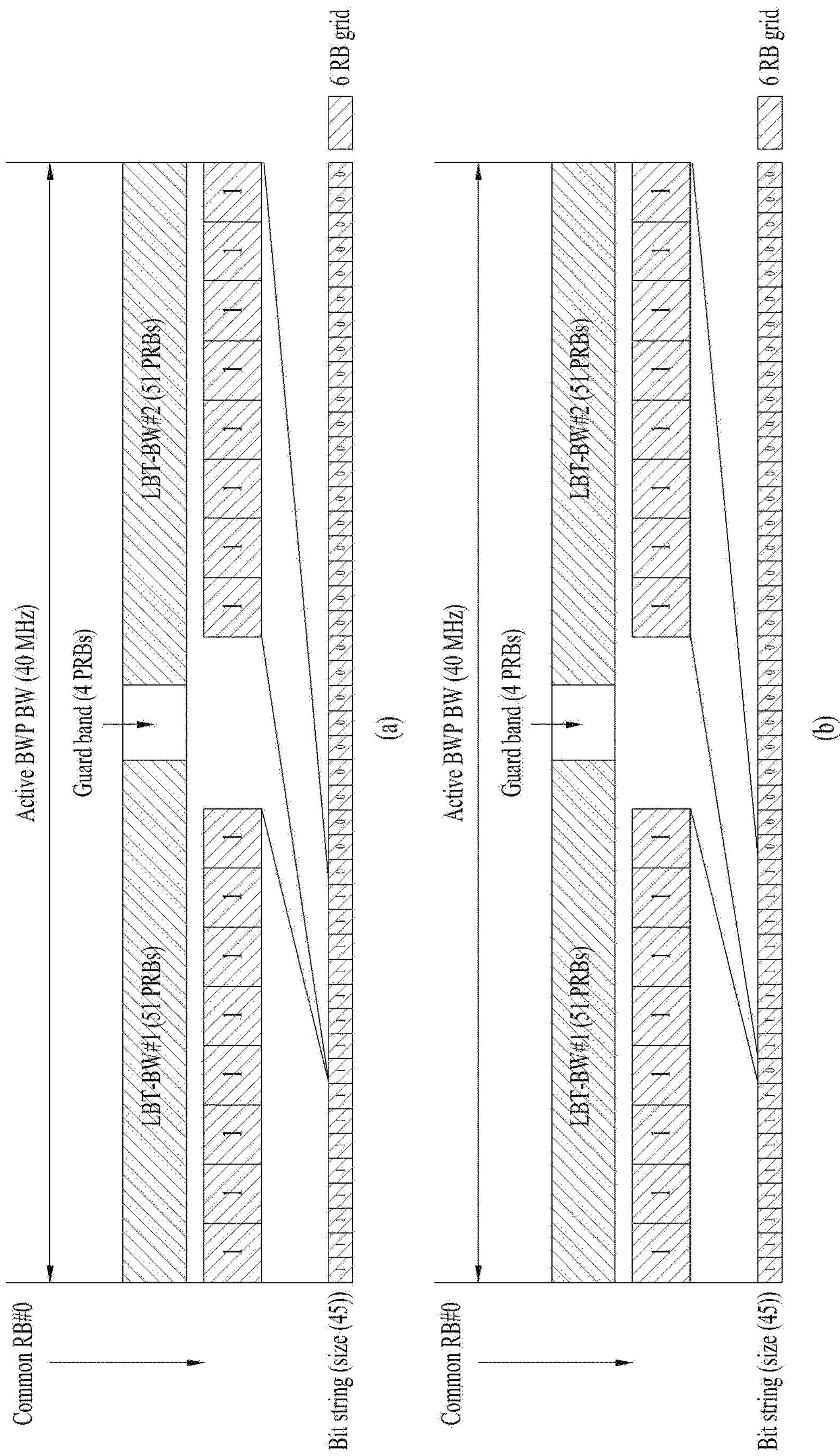

(When Mode 2, Type 2 or Type 3 is configured) As shown in FIG. 16(*a*), when there is bitmap information for a CORESET frequency domain (f-domain) resource configuration composed of a 45-bit string, the bitmap information corresponding to consecutive bitmaps corresponding to each LBT-BW (or CAP-BW) can be constructed. That is, a bitmap corresponding to the guard band is not included in a gap between bitmaps corresponding to each LBT-BW (or CAP-BW). At this time, the first RB index of the bitmap corresponding to each LBT-BW may be identical to the first RB index of each LBT-BW as shown in FIG. 16(*a*), and the corresponding first RB index may be directly signaled or may be predefined (as shown in Method #1-5). At this time, as shown in FIG. 16(*b*), a gap corresponding to N bit(s) may be present between bitmaps corresponding to each LBT-BW (or CAP-BW). This gap may be provided in preparation for the future CORESET resource utilization using the guard band or the like. The corresponding N value may be defined/configured differently according to the SCS (e.g., N=2 at 15 kHz SCS, or N=1 at 30 kHz SCS) of the CORESET.

As shown in FIG. 13, the present disclosure proposes a resource allocation method considering the Interval Y according to the CORESET frequency resource allocation method (for brevity, referred to as a legacy method) defined in Rel-15 NR. However, even when 6 RBs corresponding to the Interval Y are allocated in the corresponding method based on the CORESET frequency resource allocation method other than the legacy method, the same method can also be applied to 6 RBs corresponding to the corresponding Interval Y.

[Method #2] Method for equalizing the number of CCEs between CAP-BWs

Considering a method for configuring a PDCCH resource for each CAP-BW of the BS or a method for receiving a PDCCH for each CAP-BW of the UE, equalizing the number of CCEs present between CAP-BWs may be helpful to simplify implementation of Method #2. However, when using the method proposed by Method #1 according to the reference point A and the RB index for each CAP-BW, CORESET frequency resources may be unevenly configured according to the respective CAP-BWs. For example, assuming that the number of CCEs (or the number of RBs) configured in CAP-BW #1 corresponding to a specific CORESET is set to N1, and the number of CCEs (or the number of RBs) configured in CAP-BW #2 corresponding to the specific CORESET is set to N2 (for brevity, it is assumed that the number of CAP-BWs occupied by the corresponding CORESET is set to 2), the number of CCEs configured in CAP-BW #1 and the number of CCEs configured in CAP-BW #2 may be adjusted in response to a minimum value from among N1 and N2. If N1<N2, information indicating that the (N2−N1) CCEs (or (N2−N1) RBs) belonging to the CAP-BW do not belong to the corresponding CORESET can be recognized by the UE. In this case, a method for determining (N2−N1) CCEs (or (N2−N1) RBs) from among N2 CCEs (or N2 RBs) is needed. For this purpose, Opt1) (N2−N1) CCEs (or (N2−N1) RBs) corresponding to the lowest CCE (or RB) index from among N2 CCEs (or N2 RBs) can be removed, or Opt2) (N2−N1) CCEs (or (N2−N1) RBs) corresponding to the highest CCE (or RB) index from among N2 CCEs (or N2 RBs) can be removed.

[Method #3] CSI-RS reception method considering Interval Y

[Method #3-1] When using a UE to which CRI-RS resources overlapping the Interval Y are allocated, CSI-RS resources corresponding to the corresponding Interval Y are always assumed to be invalid.

[Method #3-2] Alternatively, when using a UE to which CSI-RS resources overlapping the Interval Y are allocated, information about whether CSI-RS resources corresponding to the corresponding Interval Y are regarded to be invalid or valid may be configured/instructed by the BS through higher layer signaling such as separate RRC/MAC signaling, through DCI, or through a combination of the higher layer signaling and the DCI. Specifically, in a DCI format for triggering aperiodic CSI-RS ("for CSI acquisition with one shot measurement restriction"), information about whether CSI-RS resources corresponding to the Interval Y are regarded to be invalid or valid in the corresponding DCI can be directly instructed. Method #3-2 has advantages in that CSI-RS resources can be more efficiently used in the "Interval Y" section, as compared to Method #3-1.

[Method #3-3] When using a UE to which CSI-RS resources overlapping the Interval Y are allocated, information about whether CSI-RS resources corresponding to the corresponding Interval Y are considered to be invalid or valid may be configured differently according to a BS operation mode to be performed by the BS. For example, if the UE is configured to operate in Mode 1, CSI-RS resources corresponding to the Interval Y are always considered to be valid. If the UE is configured to operate in Mode 2, CSI-RS resources corresponding to the Interval Y are always considered to be invalid. In other words, since the guard band is not configured in Mode 1, the period corresponding to the Interval Y is not a guard band, so that CSI-RS resources mapped to a frequency band corresponding to the Interval Y can be considered to be valid.

[Method #3-4] When using a UE to which CSI-RS resources overlapping the Interval Y are allocated, information about whether CSI-RS resources corresponding to the corresponding Interval Y are considered to be invalid or valid may be configured differently according to a BS operation type to be performed by the BS. For example, if the UE is configured to operate in Type 1, CSI-RS resources corresponding to the Interval Y are always considered to be valid. If the UE is configured to operate in Type 2, CSI-RS resources corresponding to the Interval Y are always considered to be invalid. As another example, if the UE is configured to operate in Mode 3, CSI-RS resources corresponding to the Interval Y are always considered to be invalid during the period T of the DL burst. During the remaining periods other than the period T of the DL burst, CSI-RS resources corresponding to the Interval Y are considered to be valid.

If CSI-RS resources are valid in Method #3, this means that a PDSCH rate matching can be performed in consideration of the corresponding CSI-RS resources. If CSI-RS resources are invalid in Method #3, this means that PDSCH can also be mapped to the corresponding CSI-RS resources. Alternatively, regardless of validity of the CSI-RS, PDSCH rate matching can also be performed in the Interval Y in consideration of the corresponding CSI-RS resources.

(2) Transmitter

[Method #1A] CORESET resource allocation method considering Interval Y

In Rel-15 NR, frequency resources of the CORESET may be allocated based on a bitmap of 6 RBs. Referring to the resource allocation method shown in FIG. 13, a reference point A where the common RB index #0 is started may be configured by RRC signaling, and a start RB index for each BWP and the number of RBs corresponding to a bandwidth of the BWP may be configured. When a grid of 6 RBs is drawn from the common RB index #0 and all 6 RBs are included in the corresponding BWP, bits on the bitmap corresponding to the corresponding 6 RBs can be indicated. As shown in FIG. 13, according to the above-mentioned rules, the CORESET frequency resources can be allocated to the BWP to which 106 RBs are allocated, through a total of 16-bit bitmap. Here, if bitmap information is set to '1', the corresponding 6 RBs correspond to CORESET resources. If bitmap information is set to '0', the corresponding 6 RBs may not correspond to the CORESET resources. In the present disclosure, information of '1' and '0' can be interpreted as described above, but the same method can be applied even when the information of '1' and '0' is interpreted vice versa.

[Method #1A-1] BS does not apply bits corresponding to 6 RBs overlapping the Interval Y to CORESET resource allocation. That is, in the grid of 6 RBs as shown in FIG. 13, it is assumed that bitmap information corresponding to bits #7 and #8 are not present, and it is also assumed that a total bitmap size is 14 bits as shown in FIG. 14 rather than 16 bits. Information about whether a 16-bit bitmap shown in FIG. 13 is assumed in a specific BWP or information about whether a 14-bit bitmap is assumed in a specific BWP may be separately signaled through RRC signaling. Alternatively, if the BS is configured to operate in Mode 1, and if the BS is configured to operate in Mode 2 with the 16-bit bitmap, it can be expected that the size of 14-bit bitmap can be recognized by the UE. Alternatively, if he BS is configured to operate in Type 1, and if the BS is configured to operate in Type 2 with the 16-bit bitmap, it can be expected that the size of 14-bit bitmap can be recognized by the UE. If the BS is operated to operate in Type 3, the UE may receive all of the 14-bit bitmap and the 16-bit bitmap, may utilize resource allocation information of the 14-bit bitmap when monitoring a PDCCH related to the corresponding CORESET during the period T of the DL burst, and may utilize resource allocation information of the 16-bit bitmap when monitoring a PDCCH related to the corresponding CORESET during the remaining periods other than the period T of the DL burst.

[Method #1A-2] In Method #1A-2, the BS may expect that each bit corresponding to 6 RBs overlapping the Interval Y is set to '0' (Alternatively, although each bit is set to '1', the UE may regard the bit as '0'). In the present disclosure, RBs, that are expected to be set to '0' or to be regarded to be '0', may mean that the corresponding RBs are excluded from REG-to-CCE mapping, or may mean that CCEs including the corresponding RBs are excluded from CCE-to-PDCCH mapping. In addition, when a PDSCH rate-matching pattern considering CORESET resources is configured, RBs, that are expected to be set to '0' or to be regarded to be '0', may be recognized as resources that are not considered in the rate-matching (i.e., RBs may be not identical to CORESET resources). For example, in the grid of 6 RBs shown in FIG. 13, it is assumed that bitmap information corresponding to bits #7 and #8 are always set to '0' and a total bitmap size remains at 16-bits. Information about whether the 16-bit bitmap shown in FIG. 13 will be utilized in a specific BWP, information about whether the UE expects that information corresponding to bits #7 and #8 is always '0', or information about whether the UE regards the information to be '0' may be signaled through separate RRC signaling. Alternatively, if the BS is configured to operate in Mode 1, the UE may utilize all information of the 16-bit bitmap. If the BS is configured to operate in Mode 2, the UE may expect that information corresponding to bits #7 and #8 is always '0' or may regard the corresponding information to be '0'. Alternatively, if the BS is configured to operate in Type 1, the UE may utilize all information of the 16-bit bitmap. If the BS is configured to operate in Type 2, the UE may expect that information corresponding to bits #7 and #8 is always '0' or may regard the corresponding information to be '0'. If the BS is configured to operate in Type 3, the UE may utilize all information of the 16-bit bitmap when monitoring a PDCCH related to the corresponding CORESET during the remaining periods other than the period T of the DL burst. When monitoring a PDCCH related to the corresponding CORESET during the period T of the DL burst, information corresponding to bits #7 and #8 on the 16-bit bitmap is always expected to be '0' or is regarded to be '0'.

[Method #1A-3] Method #1A-1 or Method #1A-2 may be applied according to a search space, a DCI format, and/or RNTI linked to the corresponding CORESET. For example, as in Method #1A-1, upon receiving all bitmaps of two sizes, when monitoring a PDCCH related to a specific (or a predefined or separately configured) search space, DCI format, and/or RNTI, resource allocation information on the 14-bit bitmap can be used. When monitoring a PDCCH related to the remaining (or a predefined or separately configured) search space, DCI format, and/or RNTI, resource allocation information on the 16-bit bitmap can be used. As another example, as in Method #1A-2, when monitoring a PDCCH related to a specific (or a predefined or separately configured) search space, DCI format, and/or RNTI, all information of the 16-bit bitmap may be utilized. When monitoring a PDCCH related to the remaining (or predefined or separately configured) search space, DCI format, and/or RNTI, all information of the 16-bit bitmap may be utilized, information corresponding to bits #7 and #8 on the 16-bit bitmap is always expected to be '0' or is regarded to be '0'. Specifically, when monitoring a PDCCH related to a DCI format including time and/or frequency axis resource information occupied by the BS having successfully performed the CAP, information corresponding to bits #7 and #8 on the 16-bit bitmap may be regarded to be '0' and the BS performs such monitoring. When monitoring a PDCCH related to the remaining DCI formats other than the above DCI format, the BS can perform monitoring using all information of the 16-bit bitmap.

[Method #1A-4] If a UE recognizes that any one CAP-BW from among the CAP-BW #1 and CAP-BW #2 was not transmitted through separate signaling (e.g., GC-DCI, UE-specific DCI, or DMRS sequence), Method #1A-1 or Method #1A-2 may be applied to the UE. For example, as in Method #1A-1, PDCCH monitoring can be performed by utilizing only resource allocation information corresponding to the transmitted CAP-BW from among resource allocation information of the 14-bit bitmap. As another example, as shown in Method #1A-2, information corresponding to bits #7 and #8 of the 16-bit bitmap is always expected to be '0' or is regarded to be '0', and PDCCH monitoring can be performed by utilizing only resource allocation information corresponding to the transmitted CAP-BW.

[Method #1A-5] In NR-U, CORESET index '0' may be configured to perform system information reception, etc. A single synchronization raster may be defined for each CAP-BW of a specific band (e.g., 5 GHz band) in which the NR-U system operates, and a channel raster may be predefined according to the frequency band and the carrier BW. In addition, frequency resources of the CORESET index '0' may be defined as 96 PRBs at 15 kHz SCS, and may be defined as 48 PRBs at 30 kHz SCS. If the position of the CORESET index 0 is fixed in a specific frequency band, CORESET allocation bitmap information included in the corresponding CAP-BW can be aligned (or adjusted) with the position of the corresponding CORESET index '0'. Alternatively, when candidates for the location of the CORESET index 0 can be defined in a specific frequency band, CORESET allocation bitmap information included in the corresponding CAP-BW may be aligned with the location of a specific candidate (e.g., the location of a candidate where the corresponding CAP-BW and the RB grid are aligned with each other, and the location of a candidate located closest to the RB grid of the corresponding CAP-BW) from among the plurality of candidates corresponding to the CORESET index 0. For example, in FIG. 13, if the CORESET index '0' corresponding to CAP-BW #1 is set to a 49-th PRB from the second PRB from among 50 PRBs contained in the CAP-BW #1, information indicating that the first PRB from among 6 PRBs corresponding to the first bit of the CORESET bitmap is aligned with the second PRB from among 50 PRBs contained in CAP-BW #1 can be signaled.

(In the case of using the BS operating in Mode 2, Type 2 or Type 3) As shown in FIG. 16(*a*), when there is bitmap information for a CORESET frequency domain resource configuration composed of a 45-bit string, the bitmap information corresponding to consecutive bitmaps corresponding to each LBT-BW (or CAP-BW) can be constructed. That is, a bitmap corresponding to the guard band is not included in a gap between bitmaps corresponding to each LBT-BW (or CAP-BW). At this time, the first RB index of the bitmap corresponding to each LBT-BW may be identical to the first RB index of each LBT-BW as shown in FIG. 16(*a*), and the corresponding first RB index may be directly signaled or may be predefined (as shown in Method #1A-5). At this time, as shown in FIG. 16(*b*), a gap corresponding to N bit(s) may be present between bitmaps corresponding to each LBT-BW (or CAP-BW). This gap may be provided in preparation of the future CORESET resource utilization using the guard band or the like. The corresponding N value may be defined/configured differently according to the SCS (e.g., N=2 at 15 kHz SCS, or N=1 at 30 kHz SCS) of the CORESET.

As shown in FIG. 13, the present disclosure proposes a resource allocation method considering the Interval Y according to the CORESET frequency resource allocation method (for brevity, referred to as a legacy method) defined in Rel-15 NR. However, even when 6 RBs corresponding to the Interval Y are allocated in the corresponding method based on the CORESET frequency resource allocation method other than the legacy method, the same method can also be applied to 6 RBs corresponding to the corresponding Interval Y.

[Method #2A] Method for equalizing the number of CCEs between CAP-BWs

Considering a method for configuring a PDCCH resource for each CAP-BW of the BS or a method for receiving a PDCCH for each CAP-BW of the UE, equalizing the number of CCEs present between CAP-BWs may be helpful to simplify implementation of Method #2. However, when using the method proposed by Method #1 according to the reference point A and the RB index for each CAP-BW, CORESET frequency resources may be unevenly configured according to the respective CAP-BWs. For example, assuming that the number of CCEs (or the number of RBs) configured in CAP-BW #1 corresponding to a specific CORESET is set to N1, and the number of CCEs (or the number of RBs) configured in CAP-BW #2 corresponding to the specific CORESET is set to N2 (for brevity, it is assumed that the number of CAP-BWs occupied by the corresponding CORESET is set to 2), the number of CCEs configured in CAP-BW #1 and the number of CCEs configured in CAP-BW #2 may be adjusted in response to a minimum value from among N1 and N2. If N1<N2, information indicating that the (N2−N1) CCEs (or (N2−N1) RBs) belonging to the CAP-BW do not belong to the corresponding CORESET can be recognized by the UE. In this case, a method for determining (N2−N1) CCEs (or (N2−N1) RBs) from among N2 CCEs (or N2 RBs) is needed. For this purpose, Opt1) (N2−N1) CCEs (or (N2−N1) RBs) corresponding to the lowest CCE (or RB) index from among N2 CCEs (or N2 RBs) can be removed, or Opt2) (N2−N1) CCEs (or (N2−N1) RBs) corresponding to the highest CCE (or RB) index from among N2 CCEs (or N2 RBs) can be removed.

[Method #3A] CSI-RS reception method considering Interval Y

[Method #3A-1] When using a BS configured to allocate CRI-RS resources overlapping the Interval Y, the BS may expect that the UE will always consider the CSI-RS resource corresponding to the corresponding Interval Y to be invalid.

[Method #3A-2] Alternatively, when using a BS configured to allocate CSI-RS resources overlapping the Interval Y, information about whether CSI-RS resources corresponding to the corresponding Interval Y are regarded to be invalid or valid may be configured/instructed by the BS through higher layer signaling such as separate RRC/MAC signaling, through DCI, or through a combination of the higher layer signaling and the DCI. Specifically, in a DCI format for triggering aperiodic CSI-RS ("for CSI acquisition with one shot measurement restriction"), information about whether CSI-RS resources corresponding to the Interval Y are regarded to be invalid or valid in the corresponding DCI can be directly instructed. Method #3A-2 has advantages in that CSI-RS resources can be more efficiently used in the "Interval Y" section, as compared to Method #3-1. #3A-1 아닌지 확인요망

[Method #3A-3] When using a BS configured to allocate CSI-RS resources overlapping the Interval Y, information about whether CSI-RS resources corresponding to the corresponding Interval Y are considered to be invalid or valid by the UE may be configured differently according to a BS operation mode to be performed by the BS. For example, if the BS is configured to operate in Mode 1, CSI-RS resources corresponding to the Interval Y are always considered to be valid. If the BS is configured to operate in Mode 2, CSI-RS resources corresponding to the Interval Y are always considered to be invalid.

[Method #3A-4] When using a BS configured to allocate CSI-RS resources, information about whether CSI-RS resources corresponding to the corresponding Interval Y are considered to be invalid or valid by the UE may be configured differently according to a BS operation type to be performed by the BS. For example, if the BS is configured to operate in Type 1, CSI-RS resources corresponding to the Interval Y are always considered to be valid. If the BS is configured to operate in Type 2, CSI-RS resources corresponding to the Interval Y are always considered to be invalid. As another example, if the BS is configured to operate in Mode 3, CSI-RS resources corresponding to the Interval Y are always considered to be invalid during the period T of the DL burst. During the remaining periods other than the period T of the DL burst, CSI-RS resources corresponding to the Interval Y are considered to be valid.

If CSI-RS resources are valid in Method #3A, this means that PDSCH rate matching can be performed in consideration of the corresponding CSI-RS resources. If CSI-RS resources are invalid in Method #3A, this means that PDSCH can also be mapped to the corresponding CSI-RS resources. Alternatively, regardless of validity of the CSI-RS, PDSCH rate matching can also be performed in the Interval Y in consideration of the corresponding CSI-RS resources.

Figure 17:
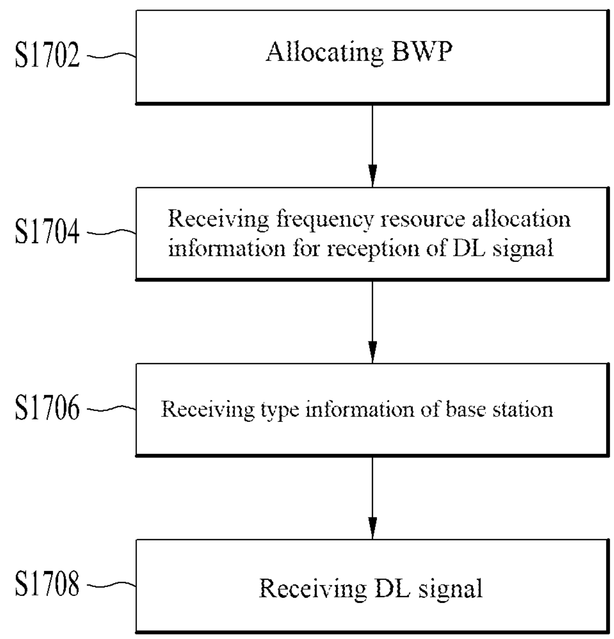
FIGS. 17 and 18 are flowcharts illustrating examples of a signal transmission process according to the embodiments of the present disclosure.
Figure 18:
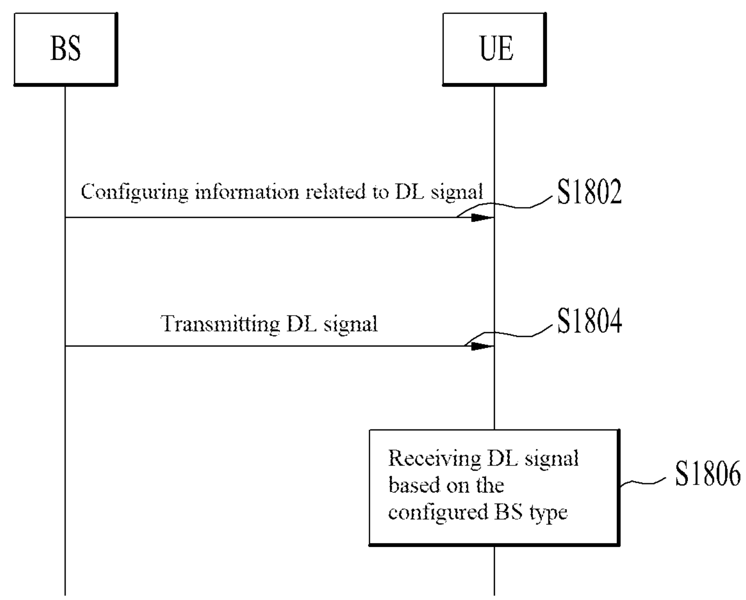

FIGS. 17 and 18 are flowcharts illustrating examples of a signal transmission process according to the embodiments of the present disclosure.

Referring to FIG. 17, the UE may receive information related to a BWP (or carrier) from the BS, so that the BWP is allocated to the UE (S1702). The UE may receive frequency resource allocation information for receiving DL signals in the BWP (S1704). For example, the UE may receive frequency resource allocation information constructing the CORESET to receive a PDCCH. The BWP may include N frequency units where the CAP for an unlicensed band (U-band) is performed, and a specific frequency resource section may be configured between the frequency units. For example, as shown in FIG. 13, in the BWP composed of 106 RBs, two frequency units (CAP-BW #1, CAP-BW #2), each of which includes 50 RBs, may be configured, and only one Interval Y corresponding to a specific frequency resource section may be configured between the CAP-BW #1 and the CAP-BW #2. Frequency resource allocation information may consist of M-bit bitmap information, and information about whether or not the DL signal is received in the specific frequency resource section (i.e., Interval Y) (i.e., information about whether data is mapped to the Interval Y) may be configured differently according to the bit values. The UE may receive BS type information of the BS (S1706), and may receive DL signals in consideration of the BS type information (S1708).

Referring to FIG. 18, the BS may configure information related to a DL signal in the UE (S1802), may transmit the DL signal based on the configured information (S1804), and may receive the DL signal based on the configured BS type information (S1806). For example, if the Dl signal is a PDCCH, the BS may configure the BWP and information about frequency resources constructing the CORESET for receiving a PDCCH in the BWP, and type information of the BS may be configured. The UE may determine whether a specific frequency resource section between the CAP-BWs is used based on the configured BS type, and may receive a PDCCH based on the result of determination.

Although FIGS. 17 and 18 illustrate that the UE receives the DL signal based on the configured BS type information, the scope or spirit of the present disclosure is not limited thereto, and may determine whether a specific frequency resource section is used based on mode information (e.g., Mode 1 or Mode 2) of the BS.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
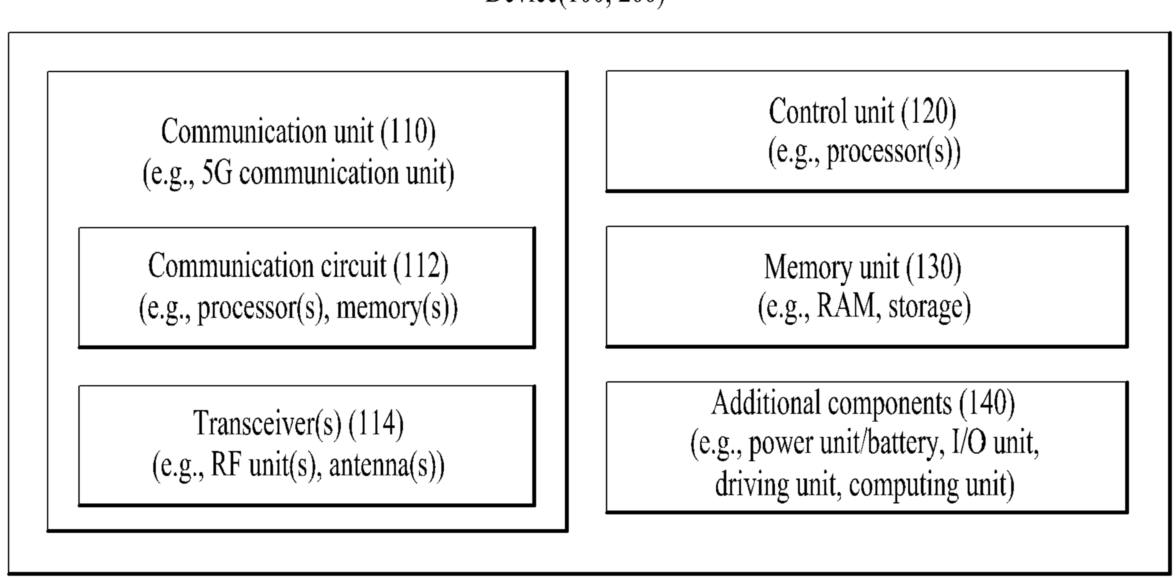
FIG. 19 illustrates an exemplary communication system applied to the present disclosure.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2D communication), or inter-BS communication (e.g. relay or integrated access backhaul(IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
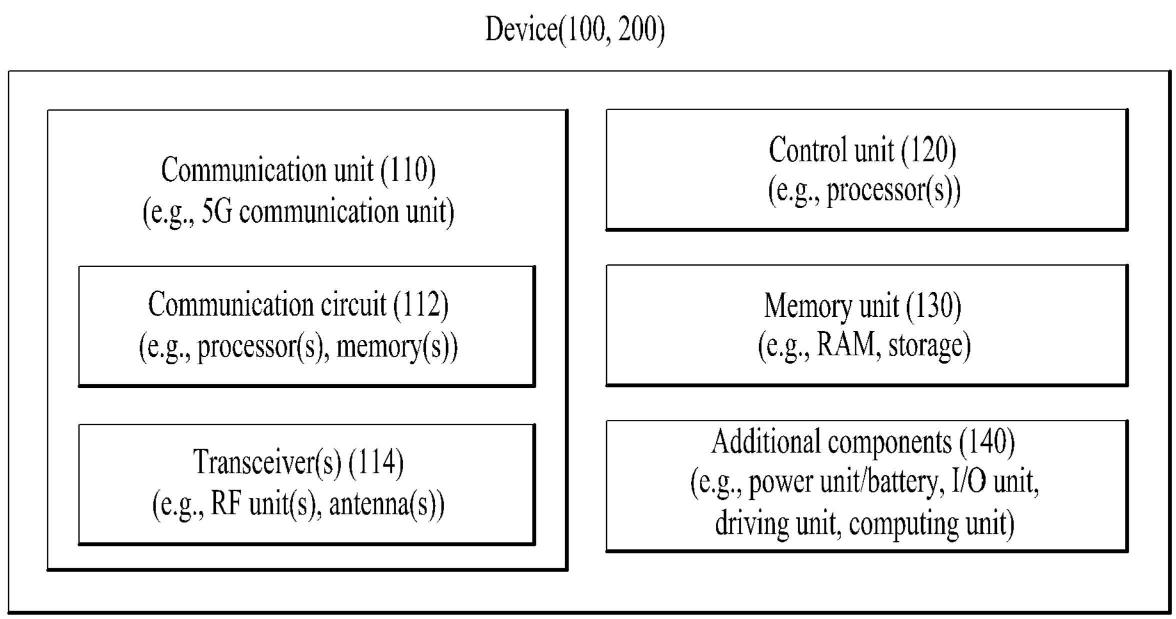
FIG. 20 illustrates an exemplary wireless device applicable to the present disclosure.

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100*x* and the BS 200} and/or {the wireless device 100*x* and the wireless device 100*x*} of FIG. 19.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and

204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
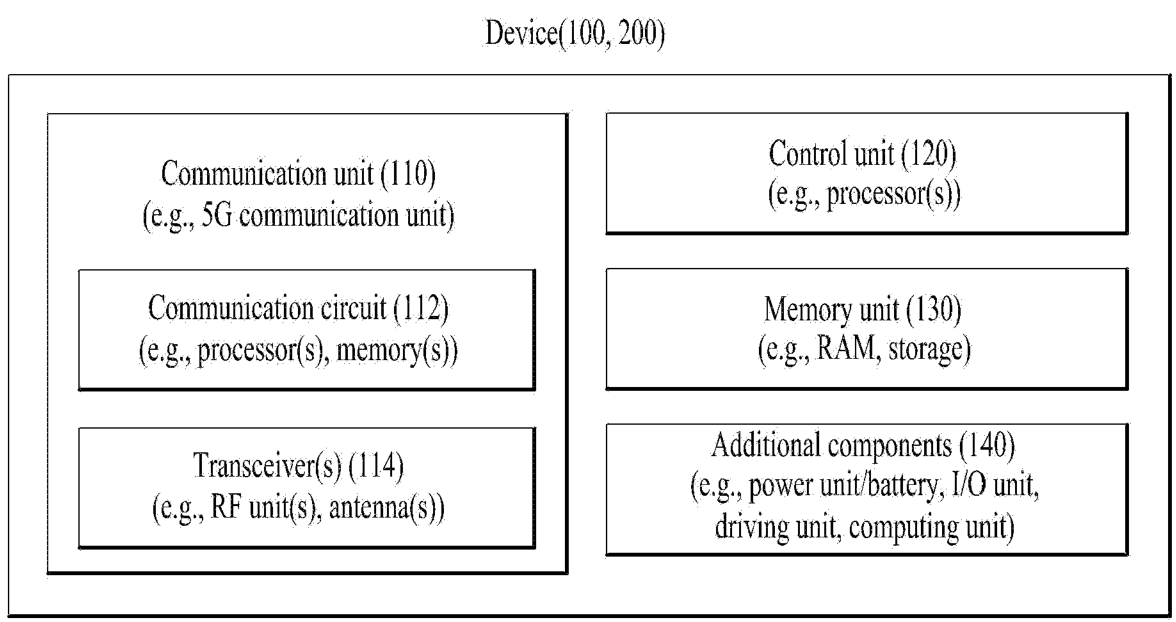
FIG. 21 illustrates another exemplary wireless device applicable to the present disclosure.

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 16 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 22:
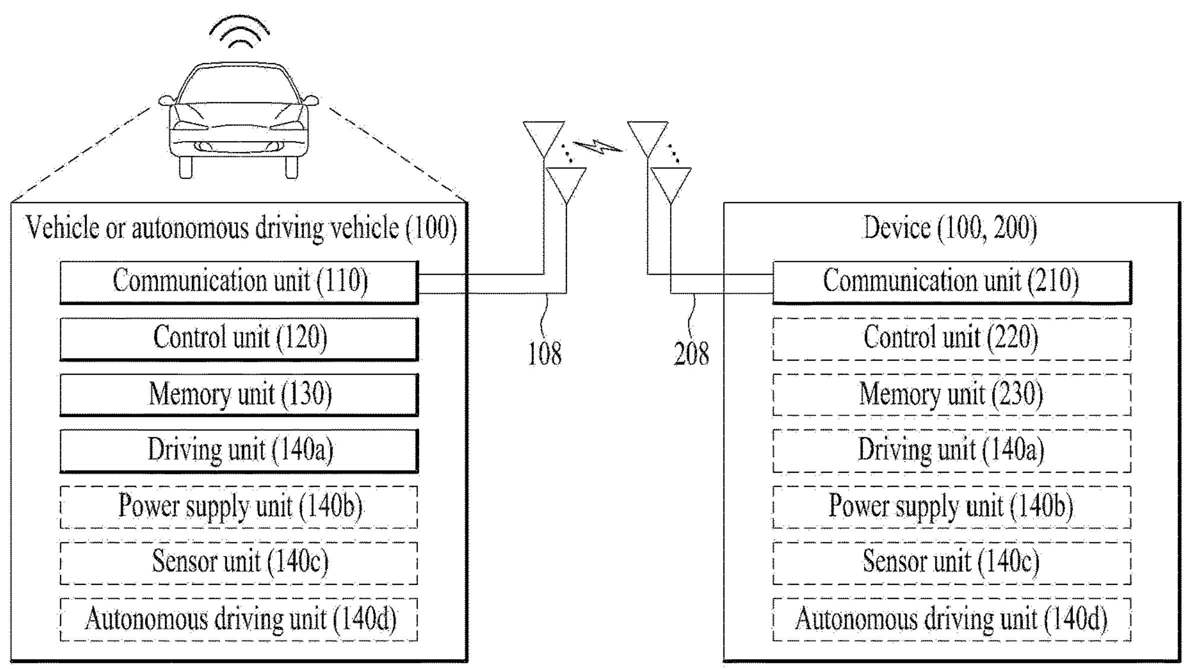
FIG. 22 illustrates an exemplary vehicle or autonomous driving vehicle applicable to the present disclosure.

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is usable for a UE, a BS or other equipments of a wireless mobile communication system.

The invention claimed is:

1. A method by a user equipment (UE) in a wireless communication system comprising:

receiving information related to a bandwidth part (BWP) for reception of a downlink signal;

receiving type information of a base station (BS);

receiving frequency resource allocation information constructing a control resource set (CORESET) in the BWP; and receiving a physical downlink control channel (PDCCH) BWP based on the type information and the frequency resource allocation information, wherein the BWP includes N number of frequency units in which a channel access procedure (CAP) for n unlicensed band is performed, where N is an integer of 2 or greater, specific frequency resource durations are configured between the frequency units, wherein the number of the specific frequency resource durations is N−1, and whether the PDCCH is received in the specific frequency resource durations is determined based on the type information.

2. The method according to claim 1, wherein:

the information related to the BWP includes a start resource block (RB) index of the BWP and the number of resource blocks (RBs) corresponding to a bandwidth of the BWP.

3. The method according to claim 1, wherein:

the frequency resource allocation information includes bitmap information of M bits, wherein M is an integer of 2 or greater, and one bit from among the M bits corresponds to one RB set composed of 6 resource blocks (RBs).

4. The method according to claim 3, wherein:

the bitmap information is configured to:

determine that, on the basis of a bit value being a first value, the PDCCH is not received in a resource block (RB) set corresponding to the bit; and determine that, on the basis of a bit value being a second value, the PDCCH is received in a resource block (RB) set corresponding to the bit.

5. The method according to claim 4, wherein:

a value of a bit corresponding to a resource block (RB) set overlapping the specific frequency resource sections is determined to be a first value.

6. The method according to claim 4, wherein:

the type information is received through higher layer signaling, wherein the type information is any one of:

i) a first type in which the PDCCH is received in the specific frequency resource durations;

ii) a second type in which the PDCCH is not received in the specific frequency resource durations; and iii) a third type in which the PDCCH is not received in a specific time duration among the specific frequency resource durations, and is received in the remaining time durations other than the specific time duration.

7. The method according to claim 6, further comprising:

receiving the PDCCH based on the M-bit bitmap information based on the type information being a first type;

receiving the PDCCH based on the M-bit bitmap information based on the type information being a second type, wherein the bit corresponding to the RB set that overlaps with the specific frequency resource durations is always determined to be a first value regardless of a predetermined value; and receiving the PDCCH based on the M-bit bitmap information in the remaining time durations other than the specific time durations based on the type information being a third type, wherein the bit corresponding to the RB set that overlaps with the specific frequency resource durations is always determined to be a first value in the specific time duration, regardless of a predetermined value.

8. The method according to claim 6, further comprising:

allocating channel state information-reference signal (CSI-RS) resources from the BWP;

determining CSI-RS resources corresponding to the specific frequency resource durations to be valid based on the type information being the first type;

determining CSI-RS resources corresponding to the specific frequency resource durations to be invalid based on the type information being the second type; and determining CSI-RS resources corresponding to the specific frequency resource durations to be invalid in the specific time period based on the type information being the third type, and determining CSI-RS resources corresponding to the specific frequency resource durations to be valid in the remaining time periods other than the specific time period.

9. A user equipment (UE) used in a wireless communication system comprising:

at least one processor;

at least one transceiver; and at least one computer memory operably connectable to the at least one processor and storing instructions that, when executed by the at least one processor, perform operations comprising:

receiving information related to a bandwidth part (BWP) for reception of a downlink signal;

receiving type information of a base station (BS);

receiving frequency resource allocation information constructing a control resource set (CORESET) in the BWP; and receiving a physical downlink control channel (PDCCH) in the BWP based on the type information and the frequency resource allocation information, wherein the BWP includes N number of frequency units in which a channel access procedure (CAP) for an unlicensed band is performed, where N is an integer of 2 or greater, specific frequency resource durations are configured between the frequency units, wherein the number of the specific frequency resource durations is N−1, and whether the PDCCH is received in the specific frequency resource durations is determined based on the type information.

10. The user equipment (UE) according to claim 9, wherein:

the user equipment (UE) is configured to communicate with at least one of a network and another autonomous vehicle other than the UE.

11. A device used in a wireless communication system comprising:

at least one processor; and at least one computer memory operably connectable to the at least one processor and storing instructions that, when executed by the at least one processor, perform operations comprising:

receiving information related to a bandwidth part (BWP) for reception of a downlink signal;

receiving type information of a base station (BS);

receiving frequency resource allocation information constructing a control resource set (CORESET) in the BWP; and receiving a physical downlink control channel (PDCCH) in the BWP based on the type information and the frequency resource allocation information, wherein the BWP includes N number of frequency units in which a channel access procedure (CAP) for an unlicensed band is performed, where N is an integer of 2 or greater, specific frequency resource durations are configured between the frequency units, wherein the number of the specific frequency resource durations is N−1, and whether the PDCCH is received in the specific frequency resource durations is determined based on the type information.

12. A computer-readable recording medium configured to store at least one computer program including instructions that enable at least one processor to perform operations for a user equipment (UE) by executing the instructions, the operation comprising:

receiving information related to a bandwidth part (BWP) for reception of a downlink signal;

receiving type information of a base station (BS);

receiving frequency resource allocation information constructing a control resource set (CORESET) in the BWP; and receiving a physical downlink control channel (PDCCH) in the BWP based on the type information and the frequency resource allocation information, wherein the BWP includes N number of frequency units in which a channel access procedure (CAP) for an unlicensed band is performed, where N is an integer of 2 or greater, specific frequency resource durations are configured between the frequency units, wherein the number of the specific frequency resource durations is N−1, and whether the PDCCH is received in the specific frequency resource durations is determined based on the type information.

* * * * *